United States Patent
Machida et al.

(10) Patent No.: US 10,823,891 B2
(45) Date of Patent: Nov. 3, 2020

(54) INFRARED-ABSORBING MATERIAL, LIQUID DISPERSION OF INFRARED-ABSORBING MATERIAL, OBJECT INCLUDING DISPERSED INFRARED-ABSORBING MATERIAL, TRANSPARENT BASE LAMINATED WITH OBJECT INCLUDING DISPERSED INFRARED-ABSORBING MATERIAL, AND INFRARED-ABSORBING TRANSPARENT BASE

(71) Applicant: SUMITOMO METAL MINING CO., LTD., Tokyo (JP)

(72) Inventors: Keisuke Machida, Ichikawa (JP); Kenji Adachi, Ichikawa (JP); Satoshi Yoshio, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 223 days.

(21) Appl. No.: 16/086,788

(22) PCT Filed: Mar. 28, 2017

(86) PCT No.: PCT/JP2017/012738
§ 371 (c)(1),
(2) Date: Sep. 20, 2018

(87) PCT Pub. No.: WO2017/170598
PCT Pub. Date: Oct. 5, 2017

(65) Prior Publication Data
US 2019/0101674 A1    Apr. 4, 2019

(30) Foreign Application Priority Data

Apr. 1, 2016 (JP) ................. 2016-074170

(51) Int. Cl.
*G02B 5/20* (2006.01)
*G02B 5/22* (2006.01)
(Continued)

(52) U.S. Cl.
CPC ........ *G02B 5/208* (2013.01); *B32B 17/10018* (2013.01); *B32B 27/18* (2013.01);
(Continued)

(58) Field of Classification Search
CPC .... G02B 5/22; G02B 5/208; B32B 17/10018; B32B 27/18
See application file for complete search history.

(56) References Cited

U.S. PATENT DOCUMENTS 7,632,767 B2    12/2009 Nagashima et al.
2004/0131845 A1    7/2004 Fujita
(Continued)

FOREIGN PATENT DOCUMENTS

DE    102012003467    8/2013
JP    H02-136230    5/1990
(Continued)

OTHER PUBLICATIONS

P Schobinger-Papamantellos et al, Magnetic ordering of rare earth monochalcogenides. I. Neutron diffraction investigation of CeS, NdS, NdSe, NdTe and TbSe, 1974 J. Phys. C: Solid State Phys. 7 2023-2038 (Year: 1974).*
(Continued)

*Primary Examiner* — Bijan Ahvazi
(74) *Attorney, Agent, or Firm* — IPUSA, PLLC

(57) ABSTRACT

An infrared-absorbing material is provided, the infrared-absorbing material including
at least one kind of transition metal; and
at least one kind of element selected from B, C, N, O, etc., as a ligand of the transition metal, wherein
(Continued)

at a bottom part of a conduction band, a bottom band of the conduction band is formed, the bottom band of the conduction band being a band occupied by d orbitals of the transition metal or a band in which the d orbitals of the transition metal and p orbitals of the ligand are hybridized, at a top part of a valence band, a top band of the valence band is formed, the top band of the valence band being a band occupied by the p orbitals of the ligand or a band in which the p orbitals of the ligand and the d orbitals of the transition metal are hybridized, in two wavenumber directions or less, which are highly symmetric points in a Brillouin zone, the bottom band of the conduction band and the top band of the valence band are close to each other by less than 3.0 eV, in another wavenumber direction excluding the wavenumber direction in which the bottom band of the conduction band and the top band of the valence band are close to each other by less than 3.0 eV, a wide band gap structure, in which a band gap is 3.0 eV or more, is formed, and a plasma frequency is 2.5 eV or more and 10.0 eV or less.

10 Claims, 7 Drawing Sheets

(51) Int. Cl.
  *B32B 17/10* (2006.01)
  *B32B 27/18* (2006.01)
  *C01B 35/04* (2006.01)
  *C01B 33/06* (2006.01)
(52) U.S. Cl.
  CPC .............. *C01B 33/06* (2013.01); *C01B 35/04* (2013.01); *G02B 5/22* (2013.01)

(56) References Cited

U.S. PATENT DOCUMENTS

| | | | |
|---|---|---|---|
| 2012/0021152 A1 | 1/2012 | Glaser et al. | |
| 2014/0335364 A1* | 11/2014 | Fujita | B32B 17/10761 428/437 |
| 2015/0158274 A1* | 6/2015 | Yabuki | B32B 27/306 428/328 |

FOREIGN PATENT DOCUMENTS

| | | |
|---|---|---|
| JP | H07-247106 | 9/1995 |
| JP | 2004-083933 | 3/2004 |
| JP | 2004-168842 | 6/2004 |
| JP | 2006-264994 | 10/2006 |
| JP | 2009-265485 | 11/2009 |
| JP | 2014-084385 | 5/2014 |
| JP | 2014-193786 | 10/2014 |
| WO | 2018/159029 | 9/2018 |

OTHER PUBLICATIONS

International Search Report dated Jun. 6, 2017 with respect to PCT/JP2017/012738.

N. Singh, et al., "Electronic structure and optical properties of rare earth hexaborides RB6 (R=La, Ce, Pr, Nd, Sm, Eu, Gd)", J. Phys.: Condens. Matter, vol. 19, 346226 (2007), pp. 1-10.

Hiromitsu Takeda et al.: "Solar Control Dispersions and Coatings With Rare-Earth Hexaboride Nanoparticles", Journal of the American Ceramic Society., vol. 91, No. 9, Sep. 1, 2008 (Sep. 1, 2008), pp. 2897-2902, XP055558233, US ISSN: 0002-7820, DOI: 10.1111/j.1551-2916.2008.02512.x.

Hongbo Tang et al.: "Optical properties and thermal stability of Poly(vinyl butyral) films embedded with LaB 6 @ SiO 2 core-shell nanoparticles", Superlattices and Microstructures., vol. 75, Nov. 1, 2014 (Nov. 1, 2014), pp. 908-915, XP055558259, GB ISSN 0749-6036, DOI: 10.1016/j.spmi.2014.09.020.

Modukuru Y et al.: "Growth and characterization of rare-earth monosulfides for cold cathode applications", Journal of Vacuum Science and Technology: Part B. AVS / AIP, Melville, New York, US. vol. 19, No. 5, Sep. 1, 2001 (Sep. 1, 2001), pp. 1958-1961, XP012008978, ISSN: 1071-1023, DOI: 10.1116/1.1406158.

* cited by examiner

INFRARED-ABSORBING MATERIAL, LIQUID DISPERSION OF INFRARED-ABSORBING MATERIAL, OBJECT INCLUDING DISPERSED INFRARED-ABSORBING MATERIAL, TRANSPARENT BASE LAMINATED WITH OBJECT INCLUDING DISPERSED INFRARED-ABSORBING MATERIAL, AND INFRARED-ABSORBING TRANSPARENT BASE

TECHNICAL FIELD

The present invention relates to an infrared-absorbing material, a liquid dispersion of an infrared-absorbing material, an object including a dispersed infrared-absorbing material, a transparent base laminated with an object including a dispersed infrared-absorbing material, and an infrared-absorbing transparent base.

BACKGROUND ART

In recent years, in order to save the earth's resources and reduce the environmental load, windows of automobiles and buildings are desired to have a function of shielding near-infrared rays in sunlight. This is because by shielding near-infrared rays at the windows of automobiles and buildings, it is possible to reduce the rise in the temperature inside an automobile or in a building and to reduce the air-conditioning load.

On the other hand, in order to maintain the original function of the window, such as securing visibility and securing safety, the window material is also desired to provide brightness sensed by the eyes, that is, to have high visible light transmittance.

Conventionally, various studies and practical applications of window materials for shielding near-infrared rays while maintaining high visible light transmittance have been made.

For example, Patent Literature 1 discloses infrared-absorbing glass including iron oxide as a coloring agent.

Furthermore, Patent Literature 2 discloses an infrared-absorbing synthetic resin molded article formed by molding a transparent or translucent synthetic resin containing $SnO_2$ fine powder in a dispersed state, into various shapes.

CITATION LIST

Patent Literature

[PTL 1]
Japanese Unexamined Patent Application Publication No. 2006-264994
[PTL 2]
Japanese Unexamined Patent Application Publication No. H02-136230

SUMMARY OF INVENTION

Technical Problem

However, according to the studies by the inventors of the present invention, in the infrared-absorbing glass disclosed in Patent Literature 1, there is a limitation in the infrared-absorption capability by Fe ions, etc. Therefore, when the visible light transmittance of the infrared-absorbing glass is increased, there has been a problem that the infrared-absorbing absorptivity is lowered.

Furthermore, in the infrared-absorbing synthetic resin molded article containing $SnO_2$ fine particles disclosed in Patent Literature 2, the contrast between the light absorption in the near-infrared region and light absorption in the visible light region is not sufficient, and therefore when high visible light transmittance is maintained, there have been cases where near-infrared rays cannot be sufficiently shielded. This is because in $SnO_2$ fine particles, the peak wavelength of light absorption is in the mid-near-infrared region having a longer wavelength than 1500 nm, and therefore $SnO_2$ fine particles cannot sufficiently absorb light of 780 nm to 1500 nm having high energy of sunlight. Therefore, for example, when the transmittance of near-infrared rays is decreased by increasing the amount of $SnO_2$ fine particles to be added, there have been cases where the visible light transmittance also decreases.

Therefore, in view of the problem of the above-described conventional technology, it is an object of one aspect of the present invention to provide an infrared-absorbing material having transparency to visible light and also near-infrared absorptivity.

Solution to Problem

In order to solve the above problem, according to one aspect of the present invention, there is provided an infrared-absorbing material including
at least one kind of transition metal; and
at least one kind of element selected from B, C, N, O, F, Al, Si, P, S, Cl, Se, and Te as a ligand of the transition metal, wherein
at a bottom part of a conduction band, a bottom band of the conduction band is formed, the bottom band of the conduction band being a band occupied by d orbitals of the transition metal or a band in which the d orbitals of the transition metal and p orbitals of the ligand are hybridized,
at a top part of a valence band, a top band of the valence band is formed, the top band of the valence band being a band occupied by the p orbitals of the ligand or a band in which the p orbitals of the ligand and the d orbitals of the transition metal are hybridized,
in two wavenumber directions or less, which are highly symmetric points in a Brillouin zone, the bottom band of the conduction band and the top band of the valence band are close to each other by less than 3.0 eV,
in another wavenumber direction excluding the wavenumber direction in which the bottom band of the conduction band and the top band of the valence band are close to each other by less than 3.0 eV, a wide band gap structure, in which a band gap is 3.0 eV or more, is formed, and
a plasma frequency is 2.5 eV or more and 10.0 eV or less.

Furthermore, according to another aspect of the present invention, there is provided an infrared-absorbing material including
at least one kind of transition metal; and
at least one kind of element selected from B, C, N, O, F, Al, Si, P, S, Cl, Se, and Te as a ligand of the transition metal, wherein
at a bottom part of a conduction band, a bottom band of the conduction band is formed, the bottom band of the conduction band being a band occupied by d orbitals of the transition metal or a band in which the d orbitals of the transition metal and p orbitals of the ligand are hybridized,
at a top part of a valence band, a top band of the valence band is formed, the top band of the valence band being a band occupied by the p orbitals of the ligand or a band in which the p orbitals of the ligand and the d orbitals of the transition metal are hybridized, in one wavenumber direction, which is a highly symmetric point in a Brillouin zone, the bottom band of the conduction band and the top band of the valence band cross each other, in two wavenumber directions or less, which are highly symmetric points in the Brillouin zone, the bottom band of the conduction band and the top band of the valence band are close to each other by less than 3.0 eV, in another wavenumber direction excluding the wavenumber direction in which the bottom band of the conduction band and the top band of the valence band cross each other or are close to each other by less than 3.0 eV, a wide band gap structure, in which a band gap is 3.0 eV or more, is formed, and a plasma frequency is 2.5 eV or more and 10.0 eV or less.

Advantageous Effects of Invention

According to one aspect of the present invention, an infrared-absorbing material having transparency to visible light and also near-infrared absorptivity, can be provided.

DESCRIPTION OF EMBODIMENTS

Figure 1:
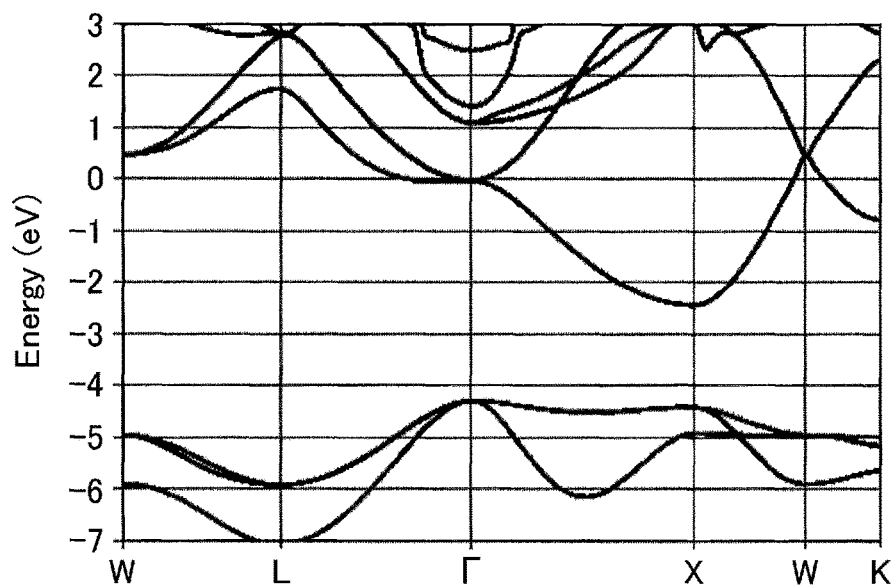
FIG. 1 illustrates an energy band structure of LaS calculated in Example 1.

Hereinafter, embodiments for carrying out the present invention will be described with reference to the drawings. However, the present invention is not limited to the following embodiments, and various modifications and substitutions may be made to the following embodiments without departing from the scope of the present invention.

Infrared-Absorbing Material

Hereinafter, one configuration example of the infrared-absorbing material according to the present embodiment will be described.

The inventors of the present invention conducted diligent studies on infrared-absorbing materials having transparency to visible light and near-infrared absorptivity. As a result, the inventors found that the band structure and the plasma frequency of the infrared-absorbing material are largely related to the determination of the visible light transmittance and the infrared-absorption capability demonstrated by the infrared-absorbing material. Among the studied materials, the inventors found that a material having a novel band structure and a high plasma frequency, which has characteristics different from infrared-absorbing materials such as ITO (tin doped indium oxide) and ATO (antimony added tin oxide) that have been conventionally used, has significantly high performance as an infrared-absorbing material.

Specifically, conventional materials such as ITO and ATO, which are near-infrared-absorbing materials, have been based on semiconductors having a band gap of 3.3 eV or more. As is well known, a semiconductor material having a band gap absorbs light having energy higher than the band gap, based on the band end absorption mechanism. Visible light has energy of 1.59 eV to 3.26 eV, and therefore a semiconductor having a band gap of 3.3 eV or more has high transmittance (transparency) to visible light.

However, the semiconductor itself has little or no carriers (free electrons or holes), and therefore light absorption by localized surface plasmon resonance cannot be demonstrated. Therefore, by substituting some of the elements in the semiconductor and doping carriers, light absorption by localized surface plasmon resonance can be demonstrated. At this time, in the band structure, a level crossing the Fermi surface, generally referred to as an impurity level, appears in the band gap. However, in any wavenumber direction in the band structure, the top and bottom edges of the above-described band gap itself are not clearly close to each other or cross each other.

That is, it has been conventional knowledge that unless the material has a wide band gap of 3.3 eV or more in all wavenumber directions, the transparency is impaired such that the material cannot be used as an infrared-absorbing material.

The inventors of the present invention conducted diligent studies without being held by conventional common knowledge of the infrared-absorbing material as described above. As a result, the inventors found, as a completely novel infrared-absorbing material, a material having a band structure clearly different from the conventional infrared-absorbing material as described above and having a band structure having high performance as an infrared-absorbing material, and completed the present invention.

That is, the infrared-absorbing material according to the present embodiment contains one or more elements selected from a group including B, C, N, O, F, Al, Si, P, S, Cl, Se, and Te, as one or more kinds of transition metals and a ligand of the transition metal. In the band structure, at the bottom part (base part) of the conduction band, that is, immediately above the band gap, a band mainly occupied by the d orbitals of the above transition metal, or a band, in which the d orbitals of the above transition metal and the p orbitals of the above ligand are hybridized, is formed. Note that any one of these bands will also be referred to as a bottom band of the conduction band.

Furthermore, at the top part of a valence band, that is, immediately below the band gap, a band mainly occupied by the p orbitals of the above ligand, or a band in which the p orbitals of the above ligand and the d orbitals of the above transition metal are hybridized, is formed. Note that any one of these bands will also be referred to as a top band of the valence band.

In the band structure of the infrared-absorbing material according to the present embodiment, in the wavenumber direction that is a highly symmetric point in the Brillouin zone, a band occupied by the d orbitals of the above transition metal or a band in which the d orbitals of the above transition metal and the p orbitals of the above ligand are hybridized, at the bottom part of the conduction band, and a band occupied by the p orbitals of the above ligand or orbitals a band in which the p orbitals of the above ligand and the d orbitals of the above transition metal are hybridized, at the above top part of the valence band, are close to each other by less than 3.0 eV or cross (intersect) each other.

More specifically, in one embodiment, in two wavenumber directions or less that are highly symmetric points in the Brillouin zone, a bottom band of the conduction band that is a band occupied by the d orbitals of the above transition metal at the bottom part of the conduction band or a band in which the d orbitals of the above transition metal and the p orbitals of the above ligand are hybridized, and a top band of the valence band that is a band occupied by the p orbitals of the above ligand of the valence band or a band in which the p orbitals of the above ligand and the d orbitals of the above transition metal are hybridized, are close to each other by less than 3.0 eV.

In yet another embodiment, in one wavenumber direction that is a highly symmetric point in the Brillouin zone, a bottom band of the conduction band that is a band occupied by the d orbitals of the above transition metal at the bottom part of the conduction band or a band in which the d orbitals of the above transition metal and the p orbitals of the above ligand are hybridized, and a top band of the valence band that is a band occupied by the p orbitals of the above ligand of the valence band or a band in which the p orbitals of the above ligand and the d orbitals of the above transition metal are hybridized, cross each other, and in two wavenumber directions or less that are highly symmetric points in the Brillouin zone, a bottom band of the conduction band that is a band occupied by the d orbitals of the above transition metal at the bottom part of the conduction band or a band in which the d orbitals of the above transition metal and the p orbitals of the above ligand are hybridized, and a top band of the valence band that is a band occupied by the p orbitals of the above ligand of the valence band or a band in which the p orbitals of the above ligand and the d orbitals of the above transition metal are hybridized, are close to each other by less than 3.0 eV.

As described above, the infrared-absorbing material according to the present embodiment may contain a transition metal and a predetermined element as a ligand of the transition metal. Note that the infrared-absorbing material according to the present embodiment may be formed of a transition metal and an element that is a ligand; however, the infrared-absorbing material according to the present embodiment may also contain an element other than the transition metal and the element as the ligand.

As described above, by including a transition metal and a predetermined ligand, it is possible to form a band derived from the transition metal and the ligand at the bottom part of the conduction band and the top part of the valence band.

Furthermore, it is preferable because it is possible to make a compound having a band structure that can form an infrared-absorbing material having transparency to visible light and near-infrared absorptivity.

Furthermore, the infrared-absorbing material according to the present embodiment can have a predetermined band structure as described above. As a result, the band crosses the Fermi level in the band gap in a particular wavenumber direction, whereby a band partially filled is formed at the bottom part of the conduction band, and high conductivity is demonstrated.

However, the infrared-absorbing material according to the present embodiment has a wide gap band structure in which the band gap is 3.0 eV or more, in other wavenumber directions excluding the particular wavenumber direction in which the above bands are close to each other and/or cross each other. Therefore, despite having a band gap of less than 3.0 eV in the particular wavenumber direction, it is possible to achieve high transparency to visible light.

Note that in the infrared-absorbing material according to the present embodiment, the band gap is 3.3 eV or more in other wavenumber directions excluding the particular wavenumber direction in which the bands are close to each other and/or cross each other, and only in the particular wavenumber direction, the band gap can be set to be less than the above band gap.

The transparency to visible light in the infrared-absorbing material according to the present embodiment does not necessarily mean complete transparency to visible light, but it is also permissible that the transparency means to absorb a part of the visible light to such an extent that there is no practical problem.

When the infrared-absorbing material according to the present embodiment absorbs a part of the wavelength of visible light, the infrared-absorbing material exhibits some degree of coloring, but maintains transparency to visible light to such an extent that there is no practical problem, and the infrared-absorbing material sufficiently demonstrates industrial value. In order to obtain a material that is more completely transparent to visible light, it is inherently preferable that the band gap is 3.3 eV or more in all wavenumber directions. However, the infrared-absorbing material according to the present embodiment has a wavenumber direction in which the bands are close to each other by 3.0 eV or less or cross each other, and in the other wavenumber directions excluding the above wavenumber direction in which the bands are close to each other or cross each other, the band gap may be 3.0 eV or more and less than 3.3 eV in some cases. That is, in view of the practicality considering the contrast of transparency to visible light and near-infrared absorption, it is not necessary that the band gap is 3.3 eV or more in all wavenumber directions; as long as the direction in which the bands are close to each other or cross each other is limited and the band gap is 3.0 eV or more in the other wavenumber directions, it is still possible to sufficiently demonstrate industrial value although part of the high energy wavelength of visible light is absorbed. Rather, the transparency of the actual film appears to be depending on the mass density of the materials in the film, and some reduction in the band gap will not matter.

As described above, the infrared-absorbing material according to the present embodiment has a band structure in which the bottom band of the conduction band and the top band of the valence band are close to each other by less than 3.0 eV in two wavenumber directions or less, that is, in one wavenumber direction or in two wavenumber directions. It is preferable that the bottom band of the conduction band and the top band of the valence band are close to each other in one wavenumber direction rather than in two wavenumber directions if the interval is the same, in terms of the transparency to visible light. However, in general, the width of the band gap changes variously according to the wavenumber direction, so that the transparency may be higher in a case where the bottom band of the conduction band and the top band of the valence band are close to each other by less than 3.0 eV in two wavenumber directions rather than being close to each other only in one wavenumber direction. However, when the bottom band of the conduction band and the top band of the valence band are close to each other by less than 3.0 eV in three wavenumber directions or more, the absorption of visible light becomes excessively high, and the transparency of the material is greatly impaired. Therefore, in the infrared-absorbing material according to the present embodiment, it is preferable that the bottom band of the conduction band and the top band of the valence band are close to each other by less than 3.0 eV in two wavenumber directions or less.

In another configuration example of the infrared-absorbing material according to the present embodiment, a case where the bottom band of the conduction band and the top band of the valence band cross each other in one wavenumber direction, is included. In this case, the Fermi energy is in a position crossing the band hanging from the bottom part of the conduction band in the corresponding wavenumber direction, and the electrons at the bottom part of the conduction band below the Fermi energy and the top part of the valence band transition to a vacancy level in the top conduction band and cause the absorption of light. The light absorption in such a wavenumber direction may be a significant factor limiting the visible light transmittance, because the energy gap width is greater than 0 eV and 3.0 eV or less. However, it has been found from orbital analysis that the transition from the p orbitals of the ligand constituting the top part of the valence band to the p orbitals of the ligand constituting the bottom part of the conduction band, and the transition from the d orbitals of the transition metal constituting the top part of the valence band to the d orbitals of the transition metal constituting the bottom part of the conduction band, are prohibited due to Fermi's golden rule, and therefore only very limited electronic transition actually occurs. Thus, even when the bottom band of the conduction band and the top band of the valence band cross each other, if there is a wide band gap structure of 3.0 eV or more in directions other than the wavenumber direction in which the bands cross and in directions other than the wavenumber direction in which the bands are close to each other, it was found that the visible transmittance is sufficiently maintained because the electron transition around the wavenumber where the bands cross is very limited.

Thus, when the band gap is close to less than 3.0 eV in two wavenumber directions or less, which are the highly symmetric points in the Brillouin zone, and the band gap is 3.0 eV or more in other wavenumber directions, an infrared-absorbing material having both high transparency to visible light and high conductivity can be attained.

Furthermore, when the bottom band of the conduction band and the top band of the valence band cross each other in one wavenumber direction, the band gap comes close to less than 3.0 eV in two wavenumber directions or less, and the band gap is 3.0 eV or more in other wavenumber directions, it is also possible to attain an infrared-absorbing material having both high transparency to visible light and high conductivity.

Furthermore, with the above band structure, in order to demonstrate an infrared absorption capability based on the localized surface plasmon resonance, it is necessary to have an appropriate plasma frequency. This is because the frequency (light energy), which causes infrared absorption based on the localized surface plasmon resonance, largely depends on the plasma frequency of the infrared-absorbing material.

Note that the plasma frequency $\Omega_p$ can be expressed by the following formula (A).

$$\Omega_p^2 = \frac{Ne^2}{\varepsilon_0 m^*} \tag{A}$$

Here, N is the free electron density, e is the elementary electric charge, $\varepsilon_0$ is the dielectric constant of the vacuum, and m* is the effective mass of electrons.

As a result of diligent studies conducted by the inventors of the present invention, it has been found that when the infrared-absorbing material according to the present embodiment has a plasma frequency of 2.5 eV or more and 10.0 eV or less, the infrared-absorbing material demonstrates high absorptivity in the infrared, particularly in the near-infrared region.

This is because when the plasma frequency is less than 2.5 eV, the free electron density is low, and therefore the absorption based on the localized surface plasmon resonance becomes very weak, and the performance as the infrared-absorbing material becomes low. Furthermore, when the plasma frequency is less than 2.5 eV, absorption by localized surface plasmon does not occur in a near-infrared region but occurs in a mid-near-infrared region having lower energy. Therefore, the performance as an infrared-absorbing material becomes low also in this case.

On the other hand, when the plasma frequency exceeds 10.0 eV, the absorption by the localized surface plasmon does not occur in the near-infrared region but occurs in the visible light region, the ultraviolet light region, and the X-ray/γ ray region, which have higher energy than the near-infrared region. Therefore, the performance as an infrared-absorbing material becomes low also in this case.

As described above, the infrared-absorbing material according to the present embodiment has a particular band structure and plasma frequency, and thus has high transparency to visible light, infrared-absorption capability, and high conductivity.

Whether the infrared-absorbing material has the band structure and the plasma frequency as described above can be determined by calculating the energy band structure of the infrared-absorbing material. The method of calculating the energy band structure is not particularly limited; however, in order to evaluate and reproduce the band gap with high precision, it is preferable to use one or more kinds of plane wave basis first principle calculation methods selected from the screened exchange method, the hybrid-functional method, and the GW method. This is because according to one or more kinds of plane wave basis first principle calculation methods selected from the screened exchange method, the hybrid-functional method, and the GW method, it is possible to achieve a highly precise band structure to such an extent as to sufficiently reproduce actual measurement values.

Furthermore, in the infrared-absorbing material according to the present embodiment, it is preferable that the imaginary part $\varepsilon_2$ of the theoretical dielectric function has a small value in a photon energy range of 1.60 eV or more and 3.30 eV or less. This is because even with the band structure and plasma frequency as described above, a substance, which has high $\varepsilon_2$ corresponding to the dielectric loss of light, absorbs a large amount of visible light in a range of 1.60 eV or more and 3.30 eV or less corresponding to visible light. As a result, the transparency to visible light may be degraded in some cases. From this viewpoint, in a range of photon energy of 1.60 eV or more and 3.30 eV or less, the imaginary part $\varepsilon_2$ of the theoretical dielectric function is preferably 5.0 or less.

More preferably, in the range of the photon energy of 1.90 eV or more and 2.45 eV or less, it is preferable that the value of the imaginary part $\varepsilon_2$ of the theoretical dielectric function is 1.5 or less and does not have a local maximum value, that is, the value does not have a peak that corresponds to inter-band transition absorption.

Note that the imaginary part $\varepsilon_2$ of the theoretical dielectric function can be calculated from the energy band structure calculated by the first principle calculation.

As the method for calculating the theoretical dielectric function from the energy band structure calculated by the first principle calculation, reference may be made to the method described in N. Singh, et al., J. Phys.: Condens. Matter, Volume 19, 346226 (2007). At this time, absorption by free electrons applies a non-negligible contribution in the visible light and near-infrared region, and therefore it is preferable to calculate the theoretical dielectric function including the Lorentz term and the Drude term. Specifically, in the obtained energy band structure, a direct transition from the valence band with lower energy than the Fermi energy to the conduction band with higher energy than Fermi energy, is obtained from the following formula (B), so that the contribution $\varepsilon_2^{lorentz}$ of the Lorentz term, among the imaginary part $\varepsilon_2$ of the theoretical dielectric function, can be calculated.

$$\varepsilon_2^{lorentz}(\omega) = \frac{8\pi e^2}{V} \langle \psi_c|r|\psi_v \rangle^2 \delta(E_v - E_c - \omega) \quad (B)$$

Note that $\omega$ is the energy of light.

From the band structure, the plasma frequency $\Omega_p$ and the relaxation constant $\gamma$ can be obtained.

Then, the contribution $\varepsilon_2^{drude}$ of the Drude term, among the imaginary part $\varepsilon_2$ of the theoretical dielectric function, can be obtained from the following formula (C) using the plasma frequency $\Omega_p$ and the relaxation constant $\gamma$ obtained by the above first principle calculation.

$$\varepsilon_2^{drude}(\omega) = \frac{\gamma \, \Omega_p^2}{\omega(\omega^2 + \gamma^2)} \quad (C)$$

Then, the imaginary part $\varepsilon_2$ of the theoretical dielectric function can be obtained by adding the contribution $\varepsilon_2^{lorentz}$ of the Lorentz term and the contribution $\varepsilon_2^{drude}$ of the Drude term.

The infrared-absorbing material according to the present embodiment has a higher heat ray shielding effect, as the integrity as a crystal becomes higher. However, even though the crystallinity is low and the diffraction peak is broadened by X-ray diffraction, if the basic bond inside the infrared crystal material is formed of the bond of each transition element and ligand, the material will demonstrate a heat ray shielding effect, and can thus be applied as the infrared-absorbing material according to the present embodiment.

As described above, the infrared-absorbing material according to the present embodiment demonstrates an infrared absorption capability on the principle of localized surface plasmon resonance. The localized surface plasmon resonance is remarkably demonstrated when the particle size of the infrared-absorbing material becomes a nanometer size, specifically, when the volume average particle diameter of the particles becomes approximately 500 nm or less. Therefore, it is preferable that the infrared-absorbing material according to the present embodiment is formed of particles having a volume average particle diameter of 500 nm or less. In particular, when the infrared-absorbing material according to the present embodiment is formed of particles having a volume average particle diameter of 200 nm or less, it is more preferable because the localized surface plasmon resonance is further strengthened.

Furthermore, in a case where the infrared-absorbing material according to the present embodiment is formed of particles having a volume average particle diameter of 500 nm or less, in a liquid dispersion of an infrared-absorbing material or in an object including a dispersed infrared-absorbing material including the infrared-absorbing material according to the present embodiment, it is possible to suppress the contact between particles in the infrared-absorbing material. Therefore, the infrared-absorbing material according to the present embodiment has conductivity, but when the infrared-absorbing material is formed of particles having a volume average particle diameter of 500 nm or less, a film (layer) fabricated by using a liquid dispersion of an infrared-absorbing material and an object including a dispersed infrared-absorbing material, may be a film and an object without any conductivity, and radio wave transmittance can be secured. Therefore, in a case where the infrared-absorbing material according to the present embodiment is formed of particles having a volume average particle diameter of 500 nm or less, this is preferable also from the viewpoint that a film fabricated by using a liquid dispersion of an infrared-absorbing material and an object including a dispersed infrared-absorbing material, including the infrared-absorbing material according to the present embodiment, can be used for various purposes requiring radio wave transmittance, such as windows of automobiles.

Furthermore, in the case of using a liquid dispersion of an infrared-absorbing material or an object including a dispersed infrared-absorbing material as described later, in consideration of reduction of scattering of light caused by the infrared-absorbing material, the infrared-absorbing material is preferably formed of particles having a volume average particle diameter of 200 nm or less.

When the infrared-absorbing material according to the present embodiment is formed into a liquid dispersion of an infrared-absorbing material or an object including a dispersed infrared-absorbing material as will be described later, if the infrared-absorbing material is formed of particles having a small volume average particle diameter, it is possible to reduce the scattering of the light in a wavelength range of 380 nm to 780 nm in the visible light region caused by geometric scattering or Mie scattering. As a result of reducing the light scattering, it is possible to avoid a situation where the object including a dispersed infrared-absorbing material becomes like frosted glass and clear transparency cannot be obtained.

When the infrared-absorbing material is formed of particles having a volume average particle diameter of 200 nm or less as described above, geometric scattering or Mie scattering described above can be particularly reduced, and a Rayleigh scattering region can be formed. In the Rayleigh scattering region, the scattered light decreases in inverse proportion to the sixth power of the particle diameter, so that the scattering decreases as the average particle diameter of the infrared-absorbing material decreases, and the transparency can be improved. Therefore, as described above, it is more preferable that the volume average particle diameter of the infrared-absorbing material is 200 nm or less.

In the case where the infrared-absorbing material according to the present embodiment is formed of particles having a volume average particle diameter of 50 nm or less, light scattering is significantly reduced, which is more preferable. From the viewpoint of avoiding light scattering, it is preferable that the average particle diameter of the infrared-absorbing material is small.

However, when the volume average particle diameter is less than 1 nm, the band structure of the material changes due to the quantum effect, and it may be difficult to adopt the band structure and the plasma frequency of the infrared-absorbing material according to the present embodiment as described above. Therefore, the infrared-absorbing material according to the present embodiment is preferably formed of particles having a volume average particle diameter of 1 nm or more, and more preferably formed of particles having a volume average particle diameter of 2 nm or more.

Note that the volume average particle diameter means a particle diameter at an integrated value of 50% in the particle size distribution, and the volume average particle diameter has the same meaning in other parts in the present specification. As a method of measuring the particle size distribution, for example, direct measurement of the particle diameter for each particle by using a transmission electron microscope may be used.

The method for manufacturing the infrared-absorbing material according to the present embodiment is not particularly limited, and any method can be adopted as long as it is a method for manufacturing an infrared-absorbing material satisfying the above-described band structure and plasma frequency.

The infrared-absorbing material according to the present embodiment can be manufactured by, for example, a solid phase firing method or a wet method. Furthermore, the infrared-absorbing material may be manufactured by applying a plasma torch method, etc.

Furthermore, the surface of the infrared-absorbing material according to the present embodiment can be coated with an oxide containing one or more kinds of elements selected from Si, Ti, Zr, and Al. By coating the surface with the above oxide, the weatherability of the infrared-absorbing material can be further improved, which is preferable. The coating method can be selected from any known method.

Liquid Dispersion of Infrared-Absorbing Material

Next, an embodiment of a liquid dispersion of an infrared-absorbing material according to the present embodiment will be described.

The liquid dispersion of an infrared-absorbing material according to the present embodiment may include the above-described infrared-absorbing material and a liquid medium. The liquid medium may contain one or more kinds of components selected from water, an organic solvent, fat and oil, liquid resin, and a liquid plasticizer for plastic.

The liquid dispersion of an infrared-absorbing material (infrared-absorbing material dispersion liquid) according to the present embodiment can be obtained by adding the above-described infrared-absorbing material to a liquid medium and carrying out dispersion treatment.

Note that any component may be added to the liquid medium other than the infrared-absorbing material, for example, a dispersant, a coupling agent, and a surfactant, etc., may be optionally added.

As described above, the liquid medium may contain one or more kinds of components selected from water, an organic solvent, fat and oil, liquid resin, and a liquid plasticizer for plastic. That is, as the liquid medium, one kind of component selected from water, an organic solvent, oil and fat, liquid resin, and a liquid plasticizer for plastic, or a mixture of two or more kinds of components selected from the above water, etc., may be used.

As the organic solvent, various solvents such as an alcohol-based solvent, a ketone-based solvent, an ester-based solvent, amides, a hydrocarbon-based solvent, and a glycol derivative, etc., may be selected. Specific examples of the organic solvent include an alcoholic-based solvent such as methanol, ethanol, 1-propanol, isopropanol (isopropyl alcohol), 1-methoxy-2-propanol, butanol, pentanol, benzyl alcohol, and diacetone alcohol; a ketone-based solvent such as acetone, dimethyl ketone, methyl ethyl ketone, methyl propyl ketone, methyl isobutyl ketone, cyclohexanone, and isophorone; an ester-based solvent such as n-butyl acetate and 3-methyl-methoxy-propionate; a glycol derivative such as ethylene glycol monomethyl ether, ethylene glycol monoethyl ether, ethylene glycol isopropyl ether, propylene glycol monomethyl ether, propylene glycol monoethyl ether, propylene glycol monomethyl ether acetate, and propylene glycol ethyl ether acetate; amides such as formamide, N-methylformamide, dimethylformamide, dimethylacetamide, and N-methyl-2-pyrrolidone; aromatic hydrocarbons such as toluene and xylene; and halogenated hydrocarbons such as ethylene chloride and chlorobenzene. Among these, an element having a low polarity is preferable, and as the organic solvent, particularly, one or more kinds of components selected from isopropyl alcohol, ethanol, 1-methoxy-2-propanol, dimethyl ketone, methyl ethyl ketone, methyl isobutyl ketone, toluene, propylene glycol monomethyl ether acetate, and n-butyl acetate, are preferably used.

As the fats and oils, for example, soybean oil, tung oil, rapeseed oil, sunflower oil, corn oil, castor oil, and cotton seed oil, etc., may be preferably used.

As the liquid resin, methyl methacrylate, etc., may be preferably used.

As the liquid plasticizer for plastic, a plasticizer that is a compound of monohydric alcohol and organic acid ester, an ester-based plasticizer that is a polyhydric alcohol organic acid ester compound, etc., and a phosphoric acid-based plasticizer that is an organic phosphoric acid-based plasticizer, etc., may be preferably used. Among these, triethylene glycol di-2-ethyl hexanoate, triethylene glycol di-2-ethyl butyrate, and tetraethylene glycol di-2-ethyl hexanoate, are preferably used because these have low hydrolyzability.

Furthermore, the infrared-absorbing material dispersion liquid according to the present embodiment may optionally contain, for example, a dispersant, a coupling agent, and a surfactant, etc.

The dispersant, the coupling agent, and the surfactant may be selected according to the purpose; however, it is preferable to have a group containing an amine, a hydroxyl group, a carboxyl group, a phosphoric acid group, or an epoxy group, as a functional group. These functional groups adsorb to the surface of the infrared-absorbing material, prevent aggregation of the infrared-absorbing material, and have the effect of uniformly dispersing the infrared-absorbing material also in an object including a dispersed infrared-absorbing material described later.

Preferable examples of the dispersant, the coupling agent, and the surfactant include a phosphate ester compound, a polymeric-based dispersant, a silane-based coupling agent, a titanate-based coupling agent, and an aluminum-based coupling agent, etc., however, the examples are not limited as such. Examples of the polymeric-based dispersant include an acrylic-based polymer dispersant, a urethane-based polymer dispersant, an acrylic block copolymer polymer-based dispersant, a polyether dispersant, and a polyester-based polymer dispersant, etc.

The amount of the dispersant, the coupling agent, and the surfactant to be added is not particularly limited; however, the addition amount is preferably 10 parts by mass or more and 1000 parts by mass or less with respect to 100 parts by mass of the infrared-absorbing material, more preferably 20 parts by mass or more and 200 parts by mass or less. When the addition amount of the dispersing agent, etc., is within the above range, aggregation of the infrared-absorbing material in the liquid can be more reliably prevented and the dispersion stability can be maintained.

The method of dispersing the infrared-absorbing material, etc., in the liquid medium may be selected from any publicly known method as long as the infrared-absorbing material is uniformly dispersed in the liquid medium, and examples of the means used for performing the method include a bead mill, a ball mill, a sand mill, a paint shaker, and ultrasonic dispersion, etc.

Note that in order to obtain a uniform infrared-absorbing material dispersion liquid, a dispersant and various other additives may be added as described above or the pH may be adjusted.

In the case of adopting a method having a strong shear stress such as a method using a bead mill or a ball mill as the method of dispersing an infrared-absorbing material, etc., in a liquid medium, at the same time as dispersing the infrared-absorbing material into the medium, the infrared-absorbing material may be microparticulated to have a fine particle size.

Then, as described above, the infrared-absorbing material according to the present embodiment demonstrates an infrared absorption capability on the principle of localized surface plasmon resonance. The phenomenon of the localized surface plasmon resonance is remarkably demonstrated when the particle size becomes a nanometer size, specifically when the volume average particle diameter of the particles becomes approximately 500 nm or less.

Therefore, it is preferable that the volume average particle diameter of the infrared-absorbing material contained in the infrared-absorbing material dispersion liquid according to the present embodiment is 500 nm or less. When the average particle diameter is 200 nm or less, the localized surface plasmon resonance is further enhanced, which is more preferable.

Therefore, when the infrared-absorbing material is not sufficiently microparticulated at the stage before dispersing the infrared-absorbing material in a liquid medium, it is preferable to adopt a method having strong shear stress such as a method using a bead mill or a ball mill as the method of the dispersing treatment. By adopting such a dispersing method, it is possible to disperse the infrared-absorbing material into the liquid medium and to microparticulate the infrared-absorbing material at the same time.

However, the volume average particle diameter of the infrared-absorbing material contained in the infrared-absorbing material dispersion liquid according to the present embodiment is preferably 1 nm or more, and more preferably 2 nm or more. Therefore, it is preferable to select the time length of performing the dispersing treatment so that the volume average particle diameter of the infrared-absorbing material becomes 1 nm or more.

The content of the infrared-absorbing material in the infrared-absorbing material dispersion liquid according to the present embodiment is not particularly limited; however, the content is preferably 0.02% by mass or more and 50% by mass or less, more preferably 0.5% by mass or more and 50% by mass or less.

This is because the infrared-absorbing material dispersion liquid containing the infrared-absorbing material by an amount of 0.02% by mass or more can demonstrate a sufficient infrared absorption effect, and for example, this infrared-absorbing material dispersion liquid can be preferably used for manufacturing a coating film or a molded plastic body described later. Furthermore, if the content of the infrared-absorbing material is 50% by mass or less, the infrared-absorbing material can be easily dispersed uniformly in the liquid medium, which makes industrial production easier.

The infrared-absorbing material dispersion liquid according to the present embodiment preferably has sufficient transmittance to visible light. The visible light transmittance of the infrared-absorbing material dispersion liquid according to the present embodiment may be adjusted by, for example, the content of the infrared-absorbing material in the infrared-absorbing material dispersion liquid.

The visible light transmittance of the infrared-absorbing material dispersion liquid according to the present embodiment may be measured, for example, by placing an infrared-absorbing material dispersion liquid in a suitable transparent container and using a spectrophotometer to measure light transmittance as a function of a wavelength. Also, for example, the infrared-absorbing material dispersion liquid may be diluted, etc., with a liquid medium and an appropriate solvent compatible with the liquid medium, so that the visible light transmittance of the infrared-absorbing material dispersion liquid becomes a desired value.

Object Including Dispersed Infrared-Absorbing Material

Next, a configuration example of an object including a dispersed infrared-absorbing material according to the present embodiment will be described.

The object including a dispersed infrared-absorbing material (infrared-absorbing material dispersion object) according to the present embodiment may include the above-described infrared-absorbing material and a thermoplastic resin.

The thermoplastic resin is not particularly limited; however, it is preferable to use one kind of resin selected from a resin group including polyethylene terephthalate resin, polycarbonate resin, acrylic resin, styrene resin, polyamide resin, polyethylene resin, vinyl chloride resin, olefin resin, epoxy resin, polyimide resin, fluororesin, an ethylene-vinyl acetate copolymer, and polyvinyl acetal resin, or a mixture of two or more kinds of resin selected from the above resin group, or a copolymer of two or more kinds of resin selected from the above resin group.

As the thermoplastic resin, for example, ultraviolet curable resin (UV curable resin) may be used. The ultraviolet curable resin is also not particularly limited; however, for example, acrylic-based UV curable resin may be suitably used.

Note that as in the transparent base laminated with an object including a dispersed infrared-absorbing material according to the present embodiment as described later, in a case where the infrared-absorbing material dispersion object is used as an intermediate layer disposed between other members, and the thermoplastic resin, etc., which is used alone as the infrared-absorbing material dispersion object, does not have sufficient flexibility or does not have sufficient adhesion to other members such as a transparent base material, for example, when the thermoplastic resin, etc., is polyvinyl acetal resin, it is preferable that the infrared-absorbing material dispersion object further contains a plasticizer.

As the plasticizer, a substance used as a plasticizer for resin in the used thermoplastic resin, may be used. For example, when polyvinyl acetal resin is used as a resin of the thermoplastic resin, etc., the plasticizer to be used may be a plasticizer that is a compound of a monohydric alcohol and an organic acid ester, an ester-based plasticizer such as a polyhydric alcohol organic acid ester compound, etc., and a phosphoric acid-based plasticizer such as an organic phosphoric acid-based plasticizer, etc. Any of these plasticizers are preferably a liquid at room temperature. Among these plasticizers, a plasticizer that is an ester compound synthesized from polyhydric alcohol and a fatty acid may be preferably used.

The amount of the infrared-absorbing material dispersed and contained in the infrared-absorbing material dispersion object is not particularly limited; however, for example, the amount is preferably 0.001% by mass or more and 80.0% by mass or less, more preferably 0.01% by mass or more and 70% by mass or less.

This is because when the content of the infrared-absorbing material is 0.001% by mass or more, a sufficient infrared absorption effect can be obtained in the infrared-absorbing material dispersion object. Furthermore, when the infrared-absorbing material is 80% by mass or less, the mechanical strength of the infrared-absorbing material dispersion object can be sufficiently increased.

Furthermore, from the viewpoint that the infrared-absorbing material dispersion object attains a sufficient infrared absorption effect and sufficiently secures visible light transmittance, the content of the infrared-absorbing material per unit projected area included in the infrared-absorbing material dispersion object is preferably 0.01 $g/m^2$ or more and 10.0 $g/m^2$ or less. Note that the "content of infrared-absorbing material per unit projected area included in the infrared-absorbing material dispersion object" means the mass (g) of the infrared-absorbing material included in the thickness direction of the infrared-absorbing material dispersion object, per unit area ($m^2$) through which light passes.

The form of the infrared-absorbing material dispersion object is not particularly limited, for example, the infrared-absorbing material dispersion object may have a sheet shape, a board shape, or a film shape, and may be applied for various purposes.

One configuration example of a method for manufacturing an infrared-absorbing material dispersion object will be described below.

The infrared-absorbing material dispersion object according to the present embodiment may be manufactured by using an infrared-absorbing material dispersion powder, a dispersion liquid in which an infrared-absorbing material is dispersed at high concentration in a plasticizer, and a master batch, and therefore, firstly, a method of manufacturing these components will be described.

By mixing the above-described infrared-absorbing material dispersion liquid and thermoplastic resin or plasticizer, and then removing the solvent component, it is possible to attain an infrared-absorbing material dispersion powder (hereinafter, sometimes simply referred to as a dispersion powder) that is a dispersion object in which the infrared-absorbing material is dispersed at a high concentration in a thermoplastic resin and/or a dispersant, or a dispersion liquid (hereinafter, sometimes simply referred to a plasticizer dispersion liquid) in which the infrared-absorbing material is dispersed at a high concentration in a plasticizer. Note that here, the solvent component means a solvent contained in the infrared-absorbing material dispersion liquid, and for example, the above-described liquid medium may be cited.

The method for removing the solvent component from the mixture of the infrared-absorbing material dispersion liquid and the thermoplastic resin or plasticizer is not particularly limited; however, for example, a method of drying, under reduced pressure, the mixture of the infrared-absorbing material dispersion liquid and the thermoplastic resin or plasticizer may be preferably used. Specifically, a mixture of the infrared-absorbing material dispersion liquid and the thermoplastic resin or plasticizer is dried under reduced pressure while stirring, to separate the solvent component from the dispersion powder or plasticizer dispersion liquid. As a device used for drying under reduced pressure, a vacuum stirring type dryer may be cited; however, the device is not particularly limited as long as the device has the above function. Furthermore, the pressure value at the time of drying under reduced pressure is also not particularly limited, and may be appropriately selected.

By using the reduced-pressure drying method when removing the solvent component from the mixture of the infrared-absorbing material dispersion liquid and the thermoplastic resin or plasticizer, the efficiency of removing the solvent from the mixture can be improved. Furthermore, the dispersion powder and the plasticizer dispersion liquid are not exposed to high temperature for a long time, and therefore aggregation of the infrared-absorbing material dispersed in the dispersion powder or the plasticizer dispersion liquid does not occur, which is preferable. Furthermore, the productivity of the dispersion powder and the plasticizer dispersion liquid is increased, and the evaporated solvent can be easily collected, which is preferable from the viewpoint of environmental consideration.

Furthermore, in the resulting dispersion powder or plasticizer dispersion liquid, the residual solvent is preferably 5% by mass or less. This is because if the residual solvent is 5% by mass or less, bubbles will not be generated when processing the dispersion powder or plasticizer dispersion liquid, for example, into an transparent base laminated with an object including a dispersed infrared-absorbing material described later, and the appearance and optical characteristics are maintained satisfactory.

Furthermore, by dispersing the infrared-absorbing material dispersion liquid or the dispersion powder in resin and pelletizing the resin, a master batch can be obtained.

A method of manufacturing the master batch will be briefly described.

First, the infrared-absorbing material dispersion liquid, the infrared-absorbing material dispersion powder, the powder object or pellets of thermoplastic resin, and if necessary, other additives, are uniformly mixed. Then, by kneading the mixture with a vent type uniaxial or biaxial extruder and processing the mixture into pellets by a general method of cutting melt-extruded strands, a master batch can be obtained.

The shape of the master batch is not particularly limited; however, the shape may be cylindrical or prismatic, for example. In manufacturing the master batch, it is also possible to adopt a so-called hot cut method in which the melt-extrudate is directly cut. In this case, it is common to make a near spherical shape.

Then, by uniformly mixing (kneading) the dispersion powder, the plasticizer dispersion liquid, or the master batch described above to be thermoplastic resin that is transparent resin, and molding and curing the mixture, the infrared-absorbing material dispersion object according to the present embodiment can be obtained.

The method of mixing (kneading) the dispersion powder, the plasticizer dispersion liquid, or the master batch, the thermoplastic resin, and a plasticizer and other additives according to need, and then molding the mixture, is not particularly limited; however, the mixture may be molded by, for example, an extrusion molding method, an injection molding method, a calendar roll method, and an inflation method, etc. Accordingly, for example, a sheet-shaped infrared-absorbing material dispersion object formed into a flat or curved shape can be manufactured.

The shape of the infrared-absorbing material dispersion object according to the present embodiment is not particularly limited; however, for example, the shape may be a sheet shape, a board shape, or a film shape as described above. From the infrared-absorbing material dispersion object having the sheet shape, the board shape, or the film shape, it is possible to manufacture a transparent base laminated with an object including a dispersed infrared-absorbing material, which will be described later.

Transparent Base Laminated with Object Including Dispersed Infrared-Absorbing Material Next, a configuration example of the transparent base laminated with an object including a dispersed infrared-absorbing material according to the present embodiment will be described.

The transparent base laminated with an object including a dispersed infrared-absorbing material according to the present embodiment includes a plurality of transparent bases and the above-described infrared-absorbing material dispersion object, and has a configuration in which the infrared-absorbing material dispersion object is disposed between a plurality of transparent bases.

The transparent bases laminated with an infrared-absorbing material dispersion object may have a structure in which an infrared-absorbing material dispersion object, which is an intermediate layer, is sandwiched from both sides with transparent bases. Note that the infrared-absorbing material dispersion object, which is an intermediate layer, preferably has a sheet shape, a board shape, or a film shape.

As the transparent base, a glass plate, plate shaped plastic, board shaped plastic, or film shaped plastic, etc., which is transparent in the visible light region, is used. That is, a transparent glass base or a transparent plastic base may be used.

The material of the plastic is not particularly limited, and the material may be selected according to the purpose, and examples thereof include polycarbonate resin, acrylic resin, polyethylene terephthalate resin, PET resin, polyamide resin, vinyl chloride resin, olefin resin, epoxy resin, polyimide resin, and fluorine resin, etc.

The transparent base laminated with an infrared-absorbing material dispersion object according to the present embodiment is obtained by laminating and integrating a plurality of opposing transparent bases sandwiching the above-described infrared-absorbing material dispersion object therebetween, for example, by a known method.

Infrared-Absorbing Transparent Base

Next, a configuration example of an infrared-absorbing transparent base according to the present embodiment will be described.

The infrared-absorbing transparent base according to the present embodiment may include a transparent base and the above-described infrared-absorbing material dispersion object disposed as a coating layer on at least one side of the transparent base.

Note that as the transparent base, for example, a transparent film base or a transparent glass base may be preferably used.

The shape of the transparent film base is not limited to a film shape, and may be, for example, a board shape or a sheet shape.

As a material of the transparent film base, for example, one or more kinds of materials selected from polyester, acrylic, urethane, polycarbonate, polyethylene, ethylene/vinyl acetate copolymer, vinyl chloride, and fluorine resin, etc., may be used. As the transparent film base, a polyester film is preferable, and a polyethylene terephthalate (PET) film is more preferable.

Furthermore, the transparent glass base is not particularly limited, and a transparent glass base such as silica glass and soda glass may be used.

Furthermore, the surface of the transparent base is preferably subjected to a surface treatment in order to enhance the adhesion to the coating layer. Furthermore, in order to improve the adhesion between the transparent base and the coating layer, it is also possible to form an intermediate layer on the transparent base and form a coating layer on the intermediate layer. The configuration of the intermediate layer is not particularly limited, and the intermediate layer may be formed, for example, by a polymer film, a metal layer, an inorganic layer (for example, an inorganic oxide layer such as silica, titania, and zirconia, etc.), and an organic/inorganic composite layer, etc.

The infrared-absorbing transparent base according to the present embodiment may be manufactured by forming a coating layer containing an infrared-absorbing material on at least one side of the transparent base, by using the above-described infrared-absorbing material dispersion liquid. A configuration example of a specific procedure will be described below.

First, a binder is added to the above-described infrared-absorbing material dispersion liquid to obtain a coating liquid.

By applying and coating the obtained coating liquid on at least one side of a transparent base, and evaporating the solvent and curing the binder by a predetermined method, a coating layer in which the infrared-absorbing material is dispersed in a medium can be formed.

As the binder, for example, an ultraviolet curable resin (UV curable resin), a thermosetting resin, an electron beam curable resin, a room temperature curable resin, and a thermoplastic resin, etc., may be selected according to the purpose. Specific examples of the binder include polyethylene resin, polyvinyl chloride resin, polyvinylidene chloride resin, polyvinyl alcohol resin, polystyrene resin, poly-propylene resin, ethylene/vinyl acetate copolymer, polyester resin, polyethylene terephthalate resin, fluorine resin, polycarbonate resin, acrylic resin, and polyvinyl butyral resin.

These resins may be used alone or in combination. Among the above-described binders for the coating layer, from the viewpoint of productivity and equipment cost, etc., it is particularly preferable to use an ultraviolet curable resin as the binder.

Furthermore, as the binder, a metal alkoxide may also be used. Examples of the metal alkoxide include alkoxides such as Si, Ti, Al, and Zr, etc. By performing hydrolysis/condensation polymerization on the binder using the above metal alkoxides by heating, etc., it is possible to form a coating layer formed of an oxide film.

Other than the above method, it is possible to form a coating layer by applying the infrared-absorbing material dispersion liquid onto a transparent film base or a transparent glass base that is a transparent base, and then further applying a binder using the above-described resin or metal alkoxide, etc.

The method of applying the coating liquid on the surface of the transparent base when providing the coating layer on the transparent base is not particularly limited, and any method may be used as long as the coating liquid containing the infrared-absorbing material dispersion liquid can be uniformly applied. For example, a bar coating method, a gravure coating method, a spray coating method, and a dip coating method, etc., may be cited.

For example, when an ultraviolet curable resin is used as a binder and a coating liquid is applied by a bar coating method, a coating liquid, which is prepared by suitably adjusting the liquid concentration and additives so as to have an appropriate leveling property, is applied on the coated on a transparent base by using a wire bar having a bar number by which the coating film thickness and the content of infrared-absorbing material can satisfy a target purpose, thereby forming a coating film. Then, after removing the solvent contained in the coating liquid by drying, the coating film is subjected to irradiation with ultraviolet rays and curing, thereby forming the coating layer on the transparent base.

At this time, the drying condition of the coating film varies depending on each component in the coating liquid and the kind and usage ratio of the solvent, etc., however; the drying condition is usually at a temperature of from 60° C. to 140° C. for 20 seconds to 10 minutes. The method of ultraviolet irradiation is not particularly limited, and a UV exposure machine such as an extra-high pressure mercury lamp may be suitably used, for example.

In addition, it is possible to adjust the adhesion between the transparent base and the coating layer, the smoothness of the coating film at the time of coating, and the drying property of the organic solvent, etc., by processes before and after the formation of the coating layer. Examples of the processes before and after the formation include a surface treatment process on the transparent base, a pre-baking (pre-heating of the substrate) process, and a post-baking (post-heating of the substrate) process, etc., and the processes may be appropriately selected.

The conditions in the prebaking process and/or the post-baking process are not particularly limited; however, the heating temperature is preferably 80° C. or more and 200° C. or less, and the heating time is preferably 30 seconds or more and 240 seconds or less, for example.

The thickness of the coating layer disposed on the transparent base is not particularly limited; however, for practical use, the thickness is preferably 10 μm or less, more preferably 6 μm or less. This is because, when the thickness of the coating layer is 10 μm or less, sufficient pencil hardness is demonstrated to attain abrasion resistance, and at the time of volatilization of the solvent in the coating layer and curing of the binder, it is possible to avoid process abnormalities such as warping of the transparent base, etc.

The lower limit of the thickness of the coating layer is, for example, preferably 0.5 μm or more, more preferably 1 μm or more, from the viewpoint of obtaining a sufficient infrared absorption effect.

The obtained infrared-absorbing transparent base preferably has the optical properties that when the visible light transmittance measured based on JIS R 3106 is 70%, the solar transmittance measured based on JIS R 3106 is 55% or less. Note that by adjusting the concentration of the infrared-absorbing material in the infrared-absorbing material dispersion liquid and the thickness of the coating layer, the visible light transmittance of the infrared-absorbing transparent base can be easily adjusted to 70%.

The content of the infrared-absorbing material per unit projected area contained in the coating layer varies depending on the substance and is not particularly limited; however, for example, the content is preferably 0.01 g/m$^2$ or more and 10.0 g/m$^2$ or less from the viewpoint of attaining a sufficient infrared absorption effect and securing sufficient visible light transmittance for the infrared-absorbing transparent base. Note that the "content of the infrared-absorbing material per unit projected area contained in the coating layer" means the mass (g) of the infrared-absorbing material included in the thickness direction of the coating layer of the infrared-absorbing transparent base, per unit area (m$^2$) through which light passes.

EXAMPLES

Hereinafter, the present invention will be described more specifically with reference to examples. However, the present invention is not limited to the following examples.

First, evaluation methods in the following examples and comparative examples will be described.

Light Absorbance

The light absorbance was measured by using a spectrophotometer (type U-4100, manufactured by Hitachi, Ltd.) and a quartz glass cell (manufactured by GL Sciences Inc.) having an optical path length of 1 mm. The measurement was performed in the wavelength range of 300 nm to 2000 nm.

Volume Average Particle Diameter

The volume average particle diameter was obtained from a particle size distribution measured by using a transmission electron microscope (TECNAI G2 F20, manufactured by FEI Company).

The calculation results, preparation conditions, and evaluation results of the respective examples and comparative examples will be described below.

Example 1

For the lanthanum monosulfide as described below, calculation of the band structure, synthesis, and evaluation were carried out.

Calculation of Band Structure

With respect to lanthanum monosulfide LaS (hereinafter, simply referred to as LaS) having a NaCl type structure and including La (lanthanum) that is a transition metal and S (sulfur) that is a ligand of the transition metal, first principle band calculation based on a hybrid-functional method was carried out. The calculated energy band structure is illustrated in FIG. 1.

As a result, it was confirmed that LaS is a conductor because the Fermi energy is at a position that partially fills the band at the bottommost part of the conduction band having the minimum value at the X point, and LaS has a wide band gap of 3.0 eV or more, particularly 3.3 eV or more, in the wavenumber directions of the W point, the L point, the F point, and the K point. However, in the wavenumber direction of the X point, the bottom part of the conduction band was close to the top part of the valence band, and it was found that the band gap was narrower than the above band gap, specifically, approximately 2.0 eV. Furthermore, the plasma frequency was calculated to be 5.3 eV.

Figure 2:
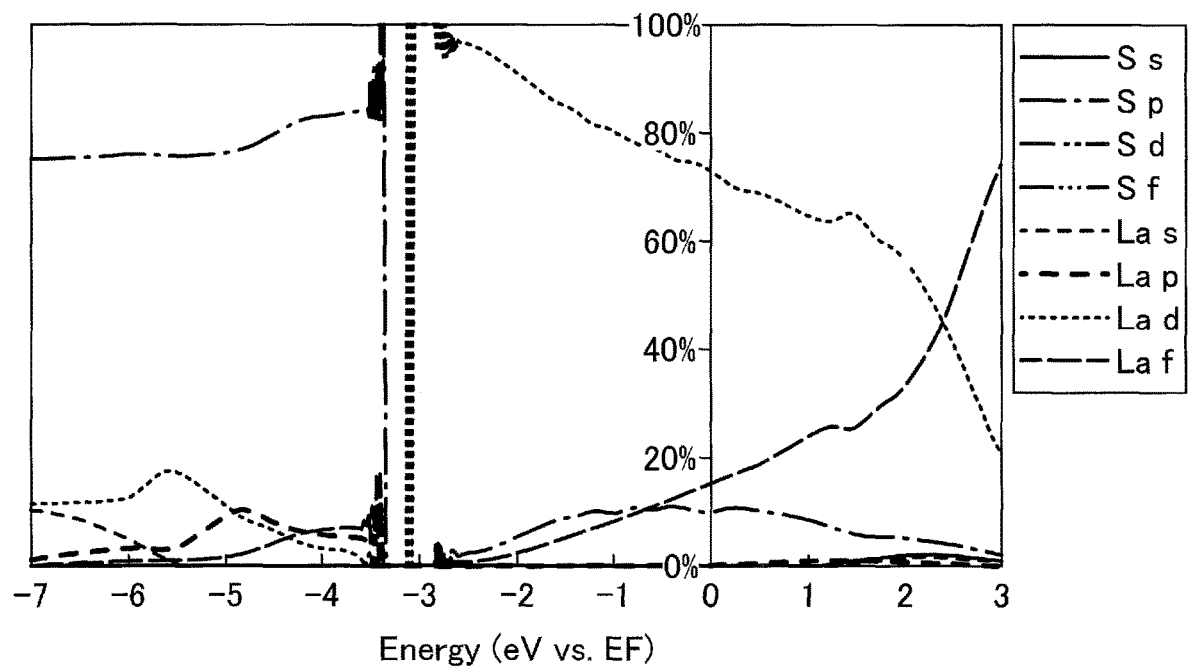
FIG. 2 is an explanatory diagram of the contribution ratios of the respective orbitals to the state density of LaS calculated in Example 1.

The state density was obtained from the calculated energy band structure and was decomposed into the contributions of the respective electron orbitals of the transition metal and the ligand, and the contribution ratio of each of the orbitals to the state density was obtained. The results are illustrated in FIG. 2. In the band structure, it was found that the bottom part of the conduction band was mainly occupied by d electrons of La that is a transition metal, and the top part of the valence band was mainly occupied by p electrons of S that is a ligand. That is, at the bottom part of the conduction band, a band occupied by the d orbitals of the transition metal La is formed, and at the top part of the valence band, a band occupied by the p orbitals of the ligand S is formed.

Figure 3:
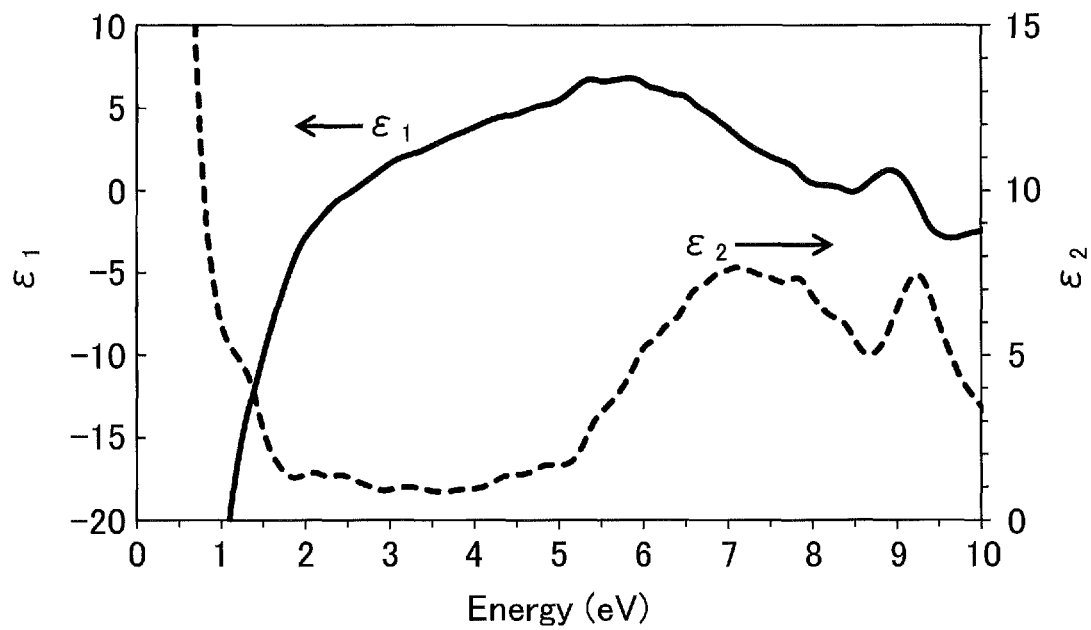
FIG. 3 is an explanatory diagram of the theoretical dielectric function of LaS calculated in Example 1.

Subsequently, a direct transition from the valence band having lower energy than the Fermi energy to the conduction band having higher energy than Fermi energy, in the obtained energy band structure, was obtained from the above-described formula (B), whereby the contribution $\varepsilon_2^{lorentz}$ of the Lorenz term, in the imaginary part $\varepsilon_2$ of the theoretical dielectric function, was calculated. Then, of the imaginary part $\varepsilon_2$ of the theoretical dielectric function, the contribution $\varepsilon_2^{drude}$ of the Drude term is obtained from the above-described formula (C) by using the plasma frequency $\Omega_p$ and the relaxation constant $\gamma$ obtained by the above-described first principle calculation. Then, the imaginary part $\varepsilon_2$ of the theoretical dielectric function was obtained by adding the contribution $\varepsilon_2^{lorentz}$ of the Lorentz term and the contribution $\varepsilon_2^{drude}$ of the Drude term. The theoretical dielectric function is illustrated in FIG. 3. In a range where the photon energy is 1.60 eV or more and 3.30 eV or less, the maximum value of the imaginary part $\varepsilon_2$ of the theoretical dielectric function was 2.6. Furthermore, in a range where the photon energy is 1.90 eV or more and 2.45 eV or less, it was confirmed that the maximum value of the imaginary part $\varepsilon_2$ of the theoretical dielectric function was 1.3 and there was no local maximum value.

Synthesis and Evaluation of LaS

In a glove box maintained in a nitrogen gas ($N_2$) atmosphere, lanthanum sesquisulfide ($La_2S_3$) powder and simple lanthanum (La) powder were weighed so that the molar ratio is 1:1, and were sufficiently mixed. Subsequently, the mixed sample was sealed in an arc melting chamber maintained in an argon (Ar) atmosphere, and arc melting treatment was performed to advance the reaction represented by the following formula, and a sample of LaS was obtained.

By performing powder XRD measurement, it was confirmed that the obtained sample was substantially a LaS single phase.

A mixture containing 10 parts by mass of LaS powder, 10 parts by mass of Disperbyk-110 (a phosphate polyester compound, manufactured by BYK Japan KK) as a dispersant, and 80 parts by mass of toluene that is an organic solvent as a liquid medium, was mixed with $ZrO_2$ beads having a diameter of 0.3 mm, and was sealed in a sample bottle made of glass. Then, the sample bottle was loaded in a paint shaker and the mixture was processed until the volume average particle diameter became 27 nm, thereby attaining an infrared-absorbing material dispersion liquid containing LaS fine particles dispersed in toluene.

The infrared-absorbing material dispersion liquid was diluted with toluene and was subjected to ultrasonic treatment, and then the light absorbance was measured by using a spectrophotometer. As a result, it was confirmed that the infrared-absorbing material dispersion liquid of LaS fine particles according to example 1 had strong absorption in the near-infrared light region of 820 nm, and had no absorption peak in the visible light region. Accordingly, it was confirmed that LaS is an infrared-absorbing material having transparency to visible light and having near-infrared absorptivity, and has high performance as an infrared-absorbing material.

When the average particle diameter of the infrared-absorbing material dispersion liquid was measured with a particle size distribution meter, the volume average particle diameter was 27 nm.

Example 2

For the neodymium mono-selenide as described below, calculation of the band structure, synthesis, and evaluation were carried out.

Calculation of Band Structure

Figure 4:
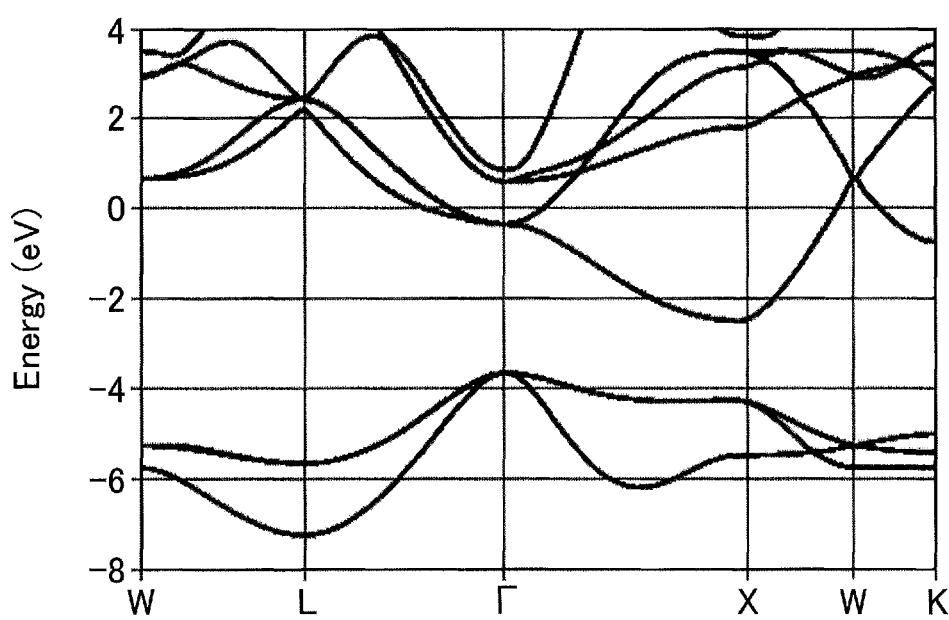
FIG. 4 illustrates an energy band structure of NdSe calculated in Example 2.

Regarding neodymium mono-selenide NdSe (hereinafter, simply referred to as NdSe) having a NaCl type structure and including Nd (neodymium) that is a transition metal and Se (selenium) as a ligand of the transition metal, as in example 1, the first principle band calculation based on the hybrid-functional method was carried out. The calculated energy band structure is illustrated in FIG. 4.

As a result, it was confirmed that NdSe is a conductor and has a wide band gap of 3.0 eV or more, particularly 3.3 eV or more in the wavenumber directions of the W point, the L point, the Γ point, and the K point. However, in the wavenumber direction of the X point, the bottom part of the conduction band was close to the top part of the valence band, and it was found that the band gap was narrower than the above band gap, specifically, approximately 1.9 eV. Furthermore, the plasma frequency was calculated to be 5.4 eV.

Figure 5:
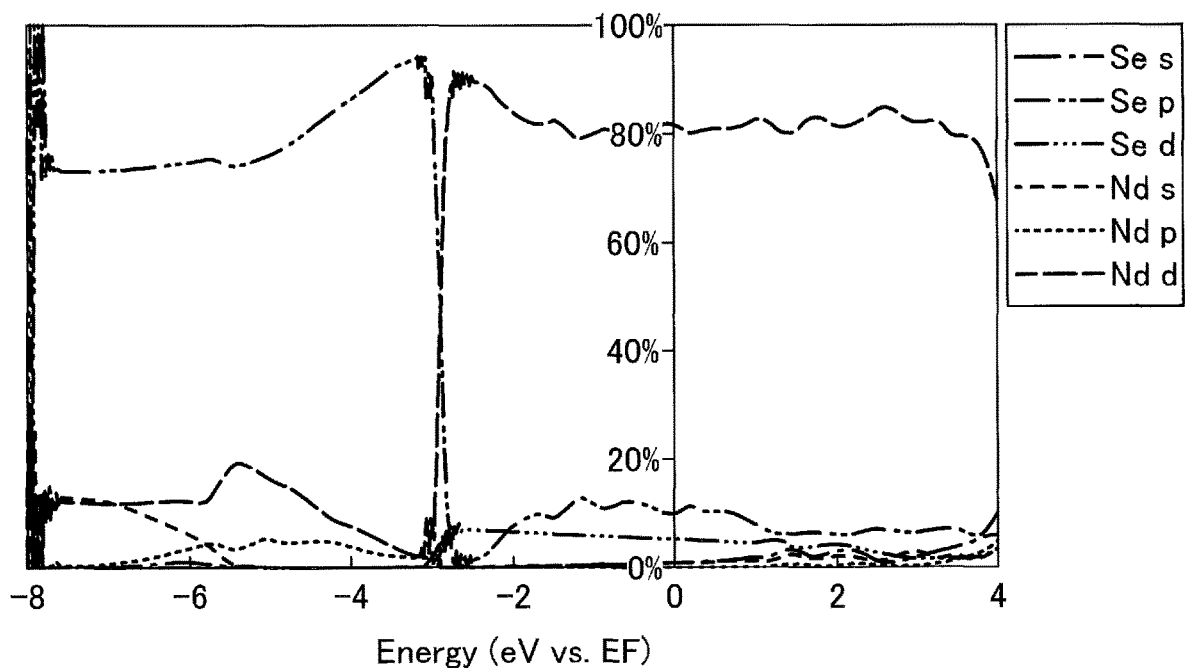
FIG. 5 is an explanatory diagram of the contribution ratios of the respective orbitals to the state density of NdSe calculated in Example 2.

As in example 1, the state density was obtained from the band structure and was decomposed into the contributions of the respective electron orbitals of the transition metal and the ligand, and the contribution ratio of each of the orbitals to the state density was obtained. The results are illustrated in FIG. 5. In the band structure, it was found that the bottom part of the conduction band was mainly occupied by d electrons of Nd that is a transition metal, and the top part of the valence band was mainly occupied by p electrons of Se that is a ligand. That is, at the bottom part of the conduction band, a band occupied by the d orbitals of the transition metal Nd is formed, and at the top part of the valence band, a band occupied by the p orbitals of the ligand Se is formed.

Figure 6:
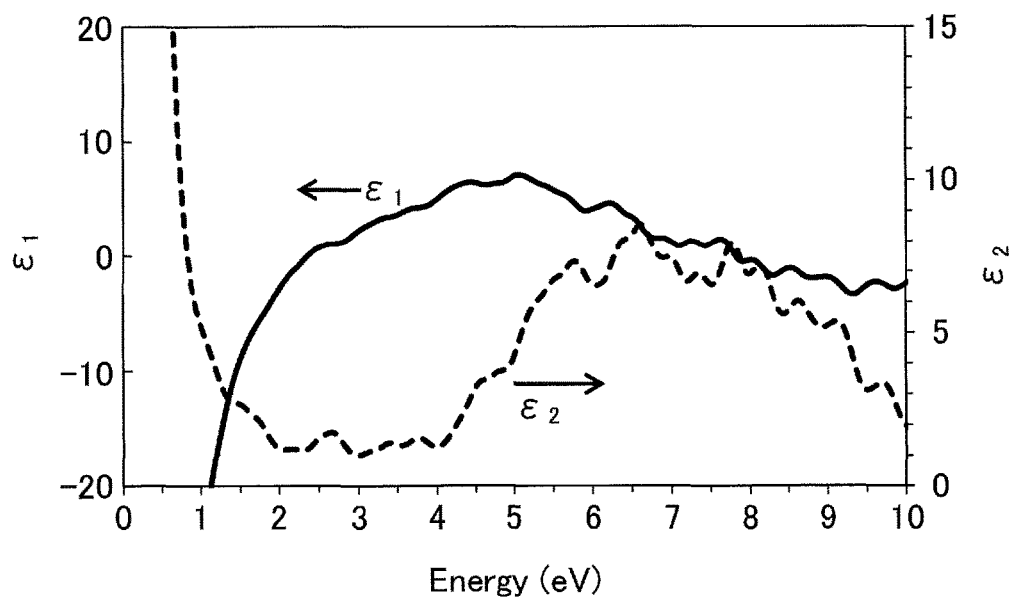
FIG. 6 is an explanatory diagram of a theoretical dielectric function of NdSe calculated in Example 2.

Subsequently, as in example 1, the imaginary part $\varepsilon_2$ of the theoretical dielectric function was obtained. The theoretical dielectric function is illustrated in FIG. 6. In a range where the photon energy is 1.60 eV or more and 3.30 eV or less, the maximum value of the imaginary part $\varepsilon_2$ of the theoretical dielectric function was 2.4. In a range where photon energy is 1.90 eV or more and 2.45 eV or less, it was confirmed that the maximum value of the imaginary part $\varepsilon_2$ of the theoretical dielectric function was 1.4 and there was no local maximum value.

Synthesis and Evaluation of NdSe

In a glove box maintained in a nitrogen gas atmosphere, elemental neodymium (Nd) powder and elemental selenium (Se) powder were weighed so as to have a molar ratio of 1:1, and were sufficiently mixed. Subsequently, the mixed sample was sealed in an arc melting chamber maintained at an argon atmosphere, and arc melting treatment was performed to advance the reaction represented by the following formula, and a sample of NdSe was obtained.

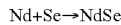

By performing powder XRD measurement, it was confirmed that the obtained sample was substantially an NdSe single phase.

A mixture containing 10 parts by mass of NdSe powder, 5 parts by mass of Ajisper PB-822 (a polymer dispersant having an amine group, Ajinomoto Fine-Techno Co., Ltd.) as a dispersant, and 85 parts by mass of toluene that is an organic solvent as a liquid medium, was mixed with $ZrO_2$ beads having a diameter of 0.3 mm, and was sealed in a sample bottle made of glass. Then, the sample bottle was loaded in a paint shaker and the mixture was processed until the volume average particle diameter became 35 nm, thereby attaining an infrared-absorbing material dispersion liquid containing NdSe fine particles dispersed in toluene.

The infrared-absorbing material dispersion liquid was diluted with toluene and was subjected to ultrasonic treatment, and then the light absorbance was measured by using a spectrophotometer as in example 1. As a result, it was confirmed that the infrared-absorbing material dispersion liquid of NdSe fine particles according to example 2 had strong absorption in the near-infrared light region of 800 nm, and had no absorption peak in the visible light region. Accordingly, it was confirmed that NdSe is an infrared-absorbing material having transparency to visible light and having near-infrared absorptivity, and has high performance as an infrared-absorbing material.

When the average particle diameter of the infrared-absorbing material dispersion liquid was measured with a particle size distribution meter, the volume average particle diameter was 35 nm.

Example 3

For yttrium calcium hexaboride, as described below, calculation of the band structure, synthesis, and evaluation were carried out.

Calculation of Band Structure

Figure 7:
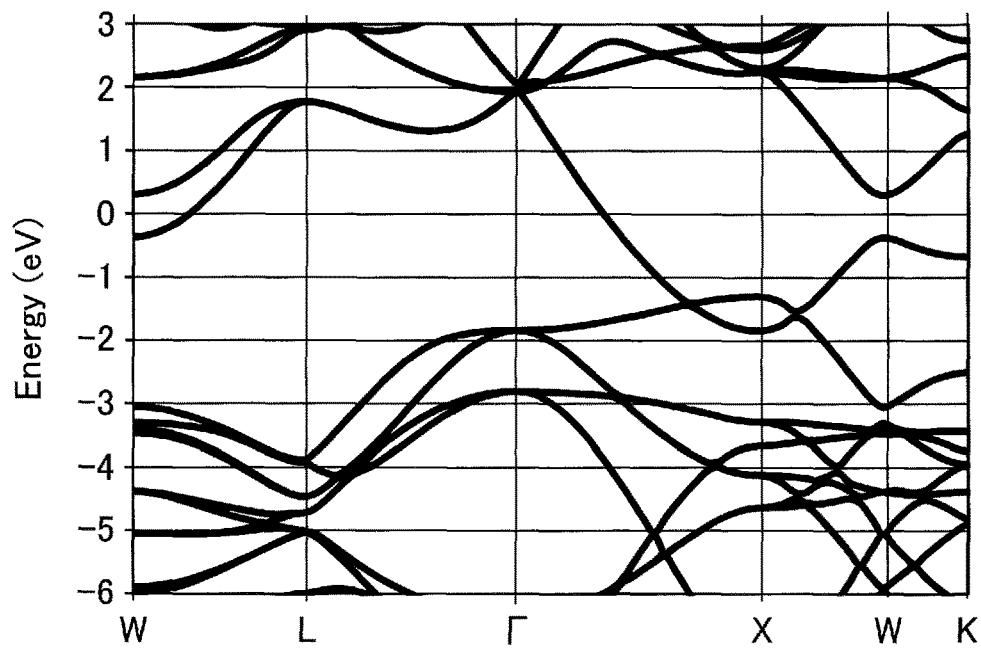
FIG. 7 illustrates an energy band structure of $Y_{0.5}Ca_{0.5}B_6$ calculated in Example 3.

Regarding yttrium calcium hexaboride $Y_{0.5}Ca_{0.5}B_6$ (hereinafter, simply referred to as $Y_{0.5}Ca_{0.5}B_6$) having a $CaB_6$ type structure and including Y (yttrium) that is a transition metal, Se (selenium) as a ligand of the transition metal, and Ca (calcium) that is a metal element that is not a transition metal, as in example 1, the first principle band calculation based on the hybrid-functional method was carried out. The calculated energy band structure is illustrated in FIG. 7.

As a result, it was confirmed that $Y_{0.5}Ca_{0.5}B_6$ is a conductor and has a wide band gap of 3.0 eV or more, particularly 3.3 eV or more in the wavenumber directions of the L point and the Γ point. However, in the wavenumber direction of the W point, the bottom part of the conduction band was close to the top part of the valence band, and it was found that the band gap was narrower than the above band gap, specifically, approximately 0.7 eV. In the wavenumber direction of the K point, it was also found that the band gap was narrower than the above band gap, specifically, approximately 1.9 eV. Furthermore, in the wavenumber direction of the X point, it was also found that the bottom part of the conduction band and the top part of the valence band cross each other. Furthermore, the plasma frequency was calculated to be 4.0 eV.

Figure 8:
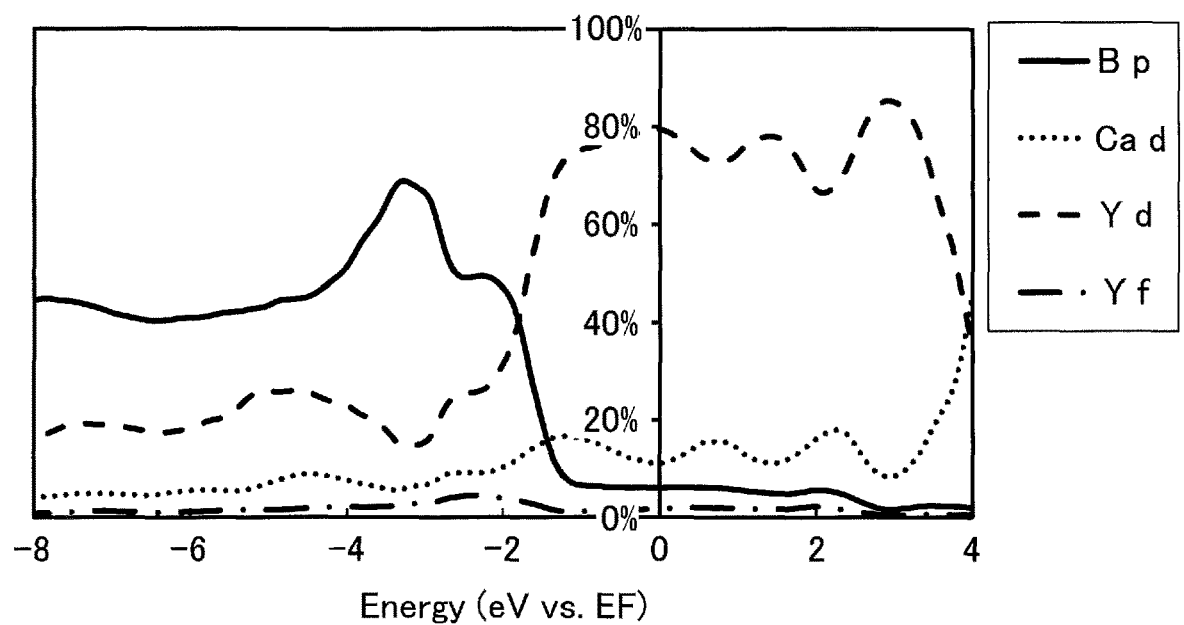
FIG. 8 is an explanatory diagram of the contribution ratios of the respective orbitals to the state density of $Y_{0.5}Ca_{0.5}B_6$ calculated in Example 3.

As in example 1, the state density was obtained from the band structure and was decomposed into the contributions of the respective electron orbitals of the transition metal and the ligand, and the contribution ratio of each of the orbitals to the state density was obtained. The results are illustrated in FIG. 8. Note that in FIG. 8, orbitals having a low contribution rate to the state density are omitted. In the band structure, it was found that the bottom part of the conduction band was mainly occupied by d electrons of Y that is a transition metal, and the top part of the valence band was mainly occupied by a mixture of p electrons of B that is a ligand and d electrons of Y that is a transition element. That is, at the bottom part of the conduction band, a band occupied by the d orbitals of the transition metal Y is formed, and at the top part of the valence band, a band occupied by a mixture of by the p orbitals of the ligand S and the d orbitals of the transition element, is formed.

Figure 9:
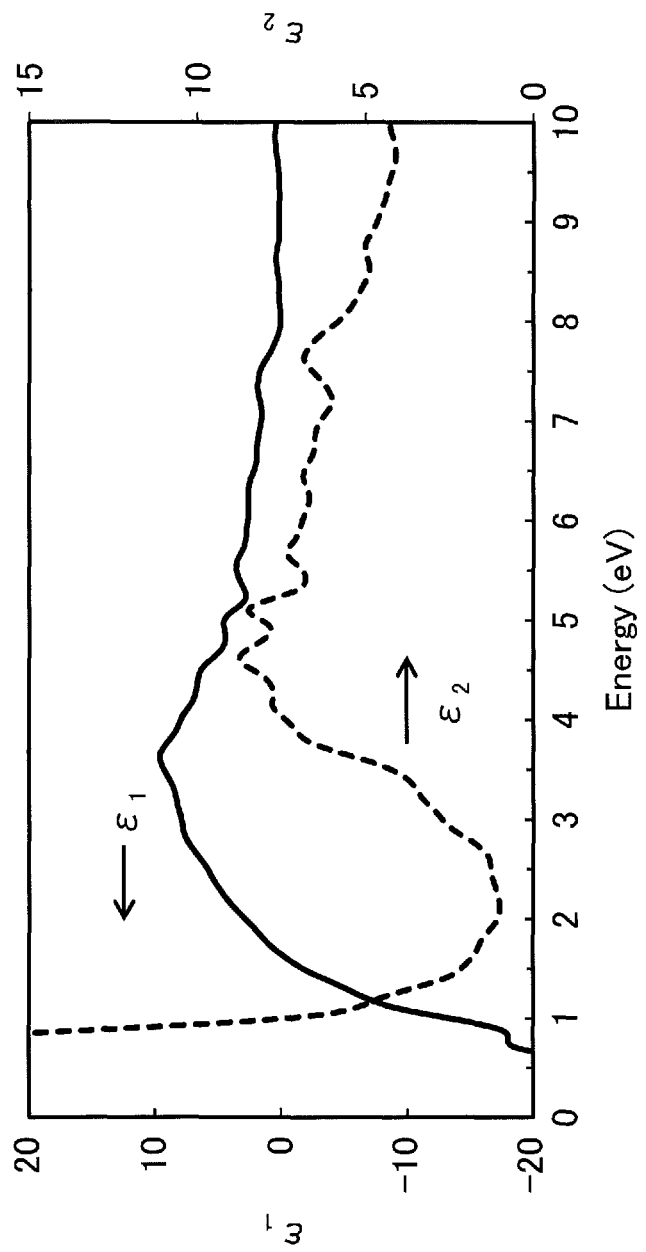
FIG. 9 is an explanatory diagram of a theoretical dielectric function of $Y_{0.5}Ca_{0.5}B_6$ calculated in Example 3.

Subsequently, as in example 1, the imaginary part $\varepsilon_2$ of the theoretical dielectric function was obtained. The theoretical dielectric function is illustrated in FIG. 9. In a range where the photon energy is 1.60 eV or more and 3.30 eV or less, the maximum value of the imaginary part $\varepsilon_2$ of the theoretical dielectric function was 3.4. In a range where photon energy is 1.90 eV or more and 2.45 eV or less, it was confirmed that the maximum value of the imaginary part $\varepsilon_2$ of the theoretical dielectric function was 1.3 and there was no local maximum value.

Synthesis and Evaluation of $Y_{0.5}Ca_{0.5}B_6$

Diyttrium trioxide $(Y_2O_3)$ powder, calcium oxide (CaO) powder, boron oxide $(B_2O_3)$ powder, and carbon (C) powder (carbon black powder) were weighed so as to have a molar ratio of 1:2:12:41, and were sufficiently mixed. Subsequently, the mixed sample was placed in a crucible and the crucible was placed in a firing furnace maintained in a vacuum atmosphere, the inside of the furnace was heated to 2000° C., and heat treatment was performed for 1 hour to advance the reaction represented by the following formula, and a sample of $Y_{0.5}Ca_{0.5}B_6$ was obtained.

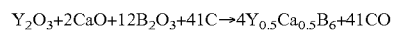

By performing powder XRD measurement, it was confirmed that the obtained sample was substantially an $Y_{0.5}Ca_{0.5}B_6$ single phase.

A mixture containing 10 parts by mass of $Y_{0.5}Ca_{0.5}B_6$ powder, 5 parts by mass of Disperbyk-2155 (a polymer dispersant having an amine group as a functional group having affinity for pigment, BYK-Chemie) as a dispersant, and 85 parts by mass of toluene that is an organic solvent as a liquid medium, was mixed with $ZrO_2$ beads having a diameter of 0.3 mm, and was sealed in a sample bottle made of glass. Then, the sample bottle was loaded in a paint shaker and the mixture was processed until the volume average particle diameter became 39 nm, thereby attaining an infrared-absorbing material dispersion liquid containing $Y_{0.5}Ca_{0.5}B_6$ fine particles dispersed in toluene.

The infrared-absorbing material dispersion liquid was diluted with toluene and was subjected to ultrasonic treatment, and then the light absorbance was measured by using a spectrophotometer as in example 1. As a result, it was confirmed that the infrared-absorbing material dispersion liquid of $Y_{0.5}Ca_{0.5}B_6$ fine particles according to example 3 had strong absorption in the near-infrared light region of 900 nm, and had no absorption peak in the visible light region. Accordingly, it was confirmed that $Y_{0.5}Ca_{0.5}B_6$ is an infrared-absorbing material having transparency to visible light and having near-infrared absorptivity, and has high performance as an infrared-absorbing material.

When the average particle diameter of the infrared-absorbing material dispersion liquid was measured with a particle size distribution meter, the volume average particle diameter was 39 nm.

Comparative Example 1

For the aluminum nitride as described below, calculation of the band structure and evaluation were carried out.

Calculation of Band Structure

Figure 10:
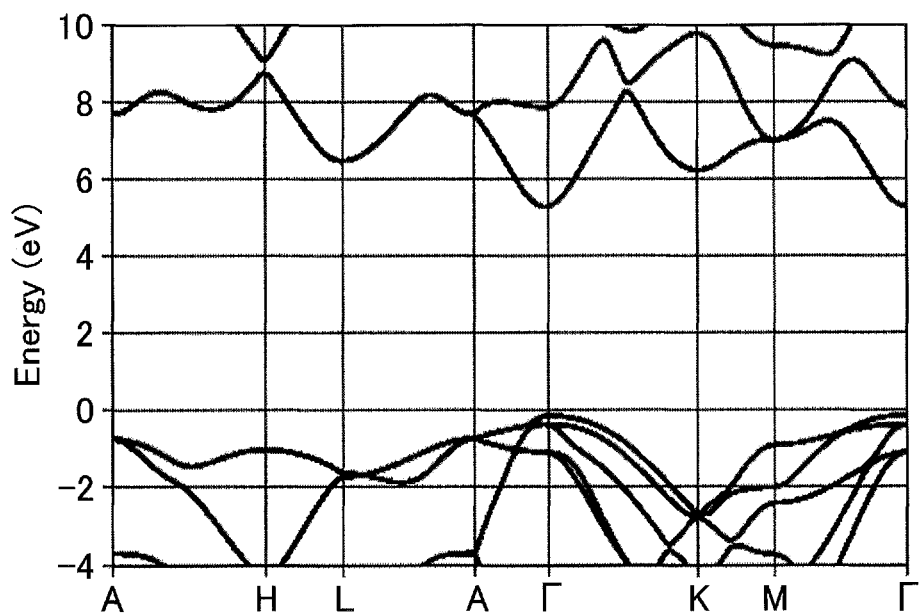
FIG. 10 illustrates an energy band structure of AlN calculated in Comparative example 1.

Regarding aluminum nitride AlN (hereinafter, simply referred to as AlN), having a rutile type structure, as in example 1, the first principle band calculation based on the hybrid-functional method was carried out. The calculated energy band structure is illustrated in FIG. 10.

As a result, it was found that AlN is an insulator, and has a band structure in which the band gap is 3.0 eV or more, particularly 3.3 eV or more in all wavenumber directions. That is, the band gap in any wavenumber direction did not become as narrow as less than 3.3 eV, in particular, less than 3.0 eV. Furthermore the plasma frequency was calculated to be 0.0 eV.

Figure 11:
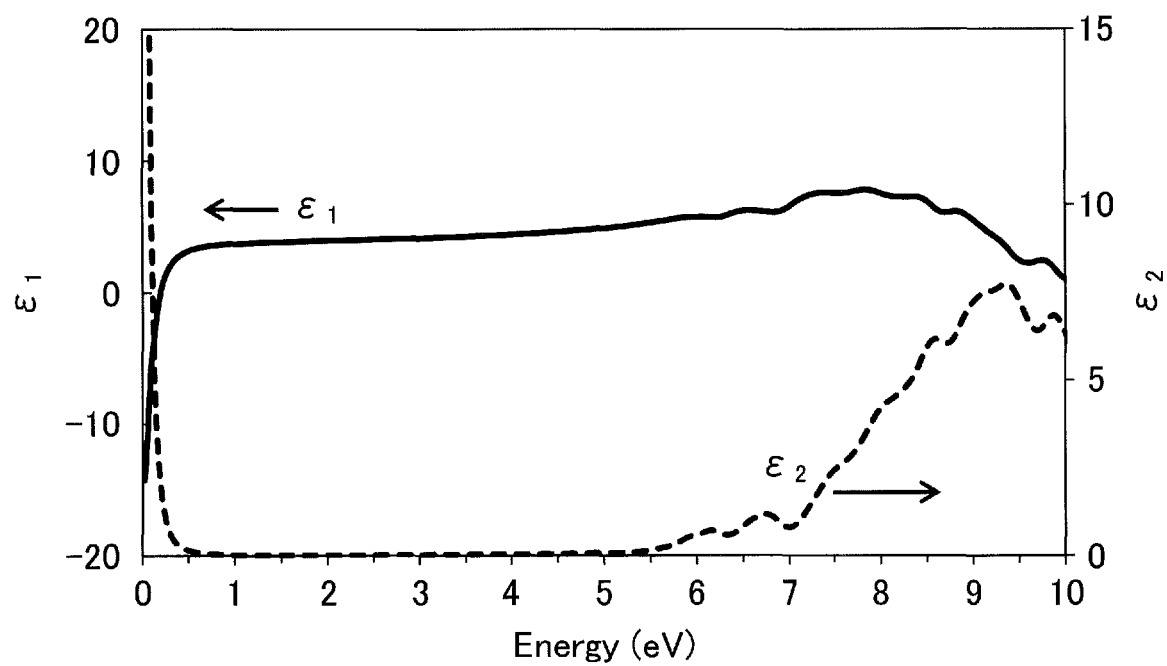
FIG. 11 is an explanatory diagram of a theoretical dielectric function of AlN calculated in Comparative example 1.

Subsequently, as in example 1, the theoretical dielectric function was calculated from the band structure. The theoretical dielectric function is illustrated in FIG. 11. In a range where the photon energy is 1.60 eV or more and 3.30 eV or less, the maximum value of the imaginary part $\varepsilon_2$ of the theoretical dielectric function was 0.02. In a range where photon energy is 1.90 eV or more and 2.45 eV or less, the maximum value of the imaginary part $\varepsilon_2$ of the theoretical dielectric function was 0.02.

Evaluation of AlN

A mixture containing 10 parts by mass of AlN fine particles, 10 parts by mass of Disperbyk-110 as a dispersant, and 80 parts by mass of toluene that is an organic solvent as a liquid medium, was mixed with $ZrO_2$ beads having a diameter of 0.3 mm, and was sealed in a sample bottle made of glass. Then, the sample bottle was loaded in a paint shaker and the mixture was processed until the volume average particle diameter became 20 nm, thereby attaining a dispersion liquid containing AlN fine particles dispersed in toluene.

The dispersion liquid was diluted with toluene and was subjected to ultrasonic treatment, and then the light absorbance was measured by using a spectrophotometer as in example 1. As a result, it was confirmed that the dispersion liquid of AlN fine particles according to comparative example 1 had absorption in the near-ultraviolet region, but had no absorption in the near-infrared light region.

Comparative Example 2

For the titanium disilicide as described below, calculation of the band structure and evaluation were carried out.

Calculation of Band Structure

Figure 12:
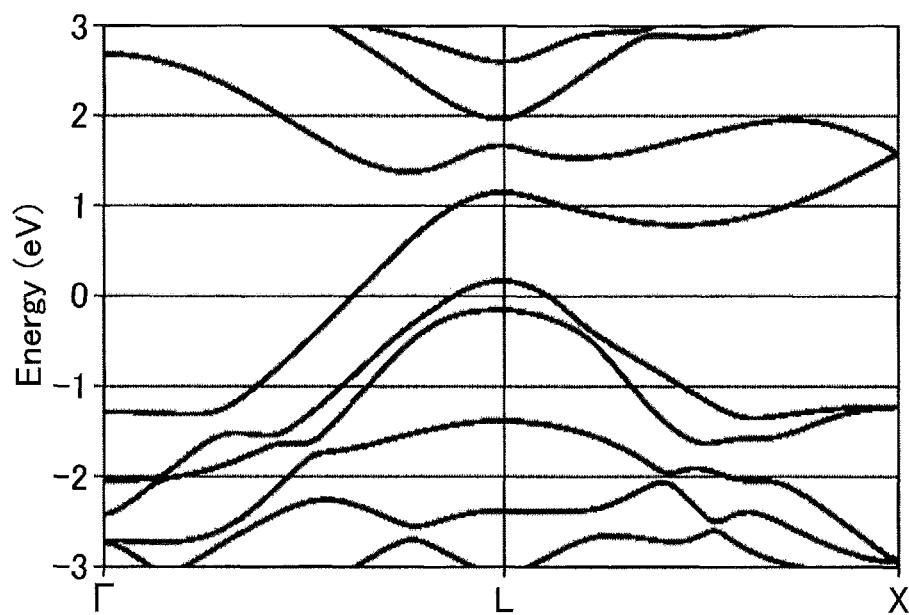
FIG. 12 illustrates an energy band structure of $TiSi_2$ calculated in Comparative example 2.

Regarding titanium disilicide $TiSi_2$ (hereinafter, simply referred to as $TiSi_2$) having a $TiSi_2$ type structure, as in example 1, the first principle band calculation based on the hybrid-functional method was carried out. As in example 1, the dielectric function was calculated from the band structure. The obtained energy band structure is illustrated in FIG. 12.

As a result, it was found that $TiSi_2$ is a conductor, but the top part of the valence band and the bottom part of the conduction band were not close to each other or crossing each other in a particular wavenumber direction. That is, the bands of the valence band and the conduction band were respectively continuously connected above and below the Fermi level, and $TiSi_2$ had a metallic band structure in which the "top part of the valence band" or "the bottom part of the conduction band" cannot be indicated. Furthermore, the plasma frequency was calculated to be 5.1 eV.

Figure 13:
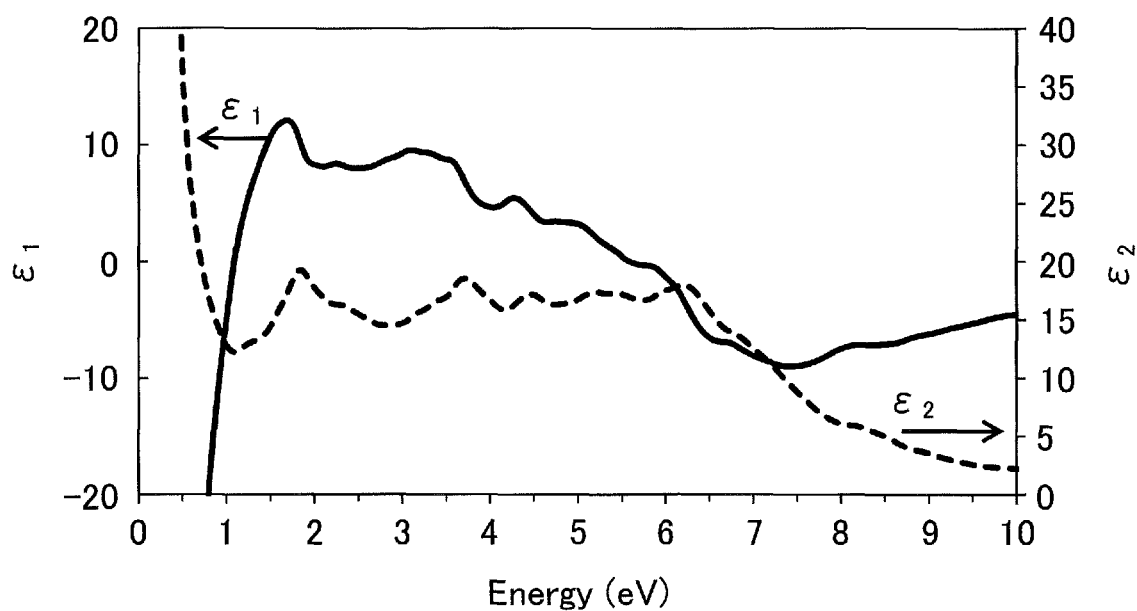
FIG. 13 is an explanatory diagram of a theoretical dielectric function of $TiSi_2$ calculated in Comparative example 2.

As in example 1, the theoretical dielectric function was calculated from the band structure. The theoretical dielectric function is illustrated in FIG. 13. In a range where the photon energy is 1.60 eV or more and 3.30 eV or less, the maximum value of the imaginary part $\varepsilon_2$ of the theoretical dielectric function was 19.2. In a range where photon energy is 1.90 eV or more and 2.45 eV or less, the maximum value of the imaginary part $\varepsilon_2$ of the theoretical dielectric function was 18.6.

Evaluation of $TiSi_2$

A mixture containing 10 parts by mass of $TiSi_2$ fine particles, 5 parts by mass of Disperbyk-2155 (a polymer dispersant having an amine group as a functional group having affinity for pigment, BYK Chemie) as a dispersant, and 85 parts by mass of toluene that is an organic solvent as a liquid medium, was mixed with $ZrO_2$ beads having a diameter of 0.3 mm, and was sealed in a sample bottle made of glass. Then, the sample bottle was loaded in a paint shaker and the mixture was processed until the volume average particle diameter became 23 nm, thereby attaining a dispersion liquid containing $TiSi_2$ fine particles dispersed in toluene.

The dispersion liquid was diluted with toluene and was subjected to ultrasonic treatment, and then the light absorbance was measured by using a spectrophotometer as in example 1. As a result, it was confirmed that the dispersion liquid of $TiSi_2$ fine particles according to comparative example 2 had very weak absorption in the near-infrared region, but also had large absorption in the visible light region, and did not have sufficient transparency to visible light.

Summary of Results of Examples and Comparative Examples

According to the results of the examples and comparative examples described above, it was confirmed that the infrared-absorbing materials of examples 1, 2, and 3 have a high function as an infrared-absorbing material, unlike the materials of comparative examples 1 and 2.

This is presumably because in examples 1, 2, and 3, a material containing a transition metal and a ligand of the transition metal including a predetermined element, and having a band structure and a plasma frequency as described below, was used.

First, at the bottom part of the conduction band, a bottom band of the conduction band is formed, which is a bottom band of the conduction band that is a band occupied by the d orbitals of the transition metal or a band in which the d orbitals of the transition metal and the p orbitals of the ligand are hybridized, and at the top part of the valence band, a top band of the valence band is formed, which is a band occupied by the p orbitals of the ligand or a band in which the p orbitals of the ligand and the d orbitals of the transition metal are hybridized.

Then, in two wavenumber directions or less, which are highly symmetric points in the Brillouin zone, the bottom band of the conduction band is close to the top band of the valence band by less than 3.0 eV, or the bottom band of the conduction band is close to the top band of the valence band by less than 3.0 eV in two wavenumber directions or less and cross each other in one wavenumber direction. In yet another wavenumber direction, there is a wide gap band structure in which the band gap is 3.0 eV or more, and the plasma frequency is 2.5 eV or more and 10.0 eV or less.

In particular, in example 3, the bottom band of the conduction band and the top band of the valence band cross each other in one wavenumber direction (X point), and furthermore, in two wavenumber directions, the bottom band of the conduction band and the top band of the valence band are close to each other by less than 3.0 eV. The light absorption in such wavenumber directions in which the bands are close to each other, the gap width of the energy is greater than 0 eV and 3.0 eV or less, and therefore it can be intuitively expected to become a significant factor limiting the visible transparency; however, in reality, high transparency was attained.

This is caused because, as illustrated in FIG. 8, the bottom part of the conduction band is mainly formed of d electrons of Y, which is a transition metal, and the top part of the valence band is mainly formed of a mixture of p electrons of B that is a ligand and d electrons of Y that is a transition element. That is, in the hybridized orbitals forming the top part of the valence band, the transition from the d orbitals of Y forming the top part of the valence band to the d orbitals of Y forming the bottom part of the conduction band, is prohibited due to Fermi's golden rule, and therefore only very limited electronic transition actually occurs. Therefore, it is considered that the electron transitions around the wavenumbers where the bands cross are very limited, so that the transparency to visible light of the material is sufficiently retained.

In contrast, in comparative example 1, the band gap was not less than 3.0 eV in any wavenumber direction, and a substance having a plasma frequency of 0.0 eV was used. As a result, the infrared-absorption capability by the localized surface plasmon resonance was not demonstrated.

Furthermore, in comparative example 2, despite the plasma frequency being in the range of 2.5 eV or more and 10.0 eV or less, the top part of the valence band and the bottom part of the conduction band did not cross each other or become close to each other in a particular wavenumber direction, and a substance having a metallic band structure in which valence bands and conduction bands are respectively continuously connected above and below the Fermi level was used. As a result, large absorption due to interband transition was observed in the visible light region, and the transparency of visible light was greatly impaired. Furthermore, a large dielectric loss was caused also in the near-infrared region, and therefore localized surface plasmon resonance was not sufficiently demonstrated, therefore the performance as an infrared-absorbing material was insufficient.

The infrared-absorbing material, the infrared-absorbing material dispersion liquid, the infrared-absorbing material dispersion object, the transparent base laminated with the infrared-absorbing material dispersion object, and the infrared-absorbing transparent base have been described above in the embodiments and examples, etc.; however, the present invention is not limited to the embodiment and examples, etc. Various modifications and changes may be made within the scope of the gist of the present invention described in the claims.

The present international patent application is based on and claims priority to Japanese Patent Application No. 2016-074170, filed on Apr. 1, 2016, the contents of which are incorporated herein by reference in their entirety.

The invention claimed is:

1. An infrared-absorbing material dispersion liquid comprising:
an infrared-absorbing material; and
a liquid medium, wherein
the liquid medium includes one or more kinds of components selected from water, an organic solvent, fat and oil, liquid resin, and a liquid plasticizer for plastic, and wherein
the infrared-absorbing material includes:
at least one kind of transition metal; and
at least one kind of element selected from B, C, N, O, F, Al, Si, P, S, Cl, Se, and Te as a ligand of the transition metal, wherein
at a bottom part of a conduction band, a bottom band of the conduction band is formed, the bottom band of the conduction band being a band occupied by d orbitals of the transition metal or a band in which the d orbitals of the transition metal and p orbitals of the ligand are hybridized,
at a top part of a valence band, a top band of the valence band is formed, the top band of the valence band being a band occupied by the p orbitals of the ligand or a band in which the p orbitals of the ligand and the d orbitals of the transition metal are hybridized,
in two wavenumber directions or less, which are highly symmetric points in a Brillouin zone, the bottom band of the conduction band and the top band of the valence band are close to each other by less than 3.0 eV,
in another wavenumber direction excluding the wavenumber direction in which the bottom band of the conduction band and the top band of the valence band are close to each other by less than 3.0 eV, a wide band gap structure, in which a band gap is 3.0 eV or more, is formed, and
a plasma frequency is 2.5 eV or more and 10.0 eV or less.

2. The infrared-absorbing material dispersion liquid according to claim 1, wherein an imaginary part $\pounds_2$ of a theoretical dielectric function is 5.0 or less, in a photon energy range of 1.60 eV or more and 3.30 eV or less.

3. The infrared-absorbing material dispersion liquid according to claim 1, wherein an imaginary part $\pounds_2$ of a theoretical dielectric function is 1.5 or less and the imaginary part $\pounds_2$ has no local maximum value, in a photon energy range of 1.90 eV or more and 2.45 eV or less.

4. The infrared-absorbing material dispersion liquid according to claim 1, wherein the infrared-absorbing material is formed of particles having a volume average particle diameter of 1 nm or more and 500 nm or less.

5. An infrared-absorbing material dispersion liquid comprising:
an infrared-absorbing material; and
a liquid medium, wherein
the liquid medium includes one or more kinds of components selected from water, an organic solvent, fat and oil, liquid resin, and a liquid plasticizer for plastic, and wherein
the infrared-absorbing material includes:
at least one kind of transition metal; and
at least one kind of element selected from B, C, N, O, F, Al, Si, P, S, CI, Se, and Te as a ligand of the transition metal, wherein
at a bottom part of a conduction band, a bottom band of the conduction band is formed, the bottom band of the conduction band being a band occupied by d orbitals of the transition metal or a band in which the d orbitals of the transition metal and p orbitals of the ligand are hybridized,
at a top part of a valence band, a top band of the valence band is formed, the top band of the valence band being a band occupied by the p orbitals of the ligand or a band in which the p orbitals of the ligand and the d orbitals of the transition metal are hybridized,
in one wavenumber direction, which is a highly symmetric point in a Brillouin zone, the bottom band of the conduction band and the top band of the valence band cross each other,
in two wavenumber directions or less, which are highly symmetric points in the Brillouin zone, the bottom band of the conduction band and the top band of the valence band are close to each other by less than 3.0 eV,
in another wavenumber direction excluding the wavenumber direction in which the bottom band of the conduction band and the top band of the valence band cross each other or are close to each other by less than 3.0 eV, a wide band gap structure, in which a band gap is 3.0 eV or more, is formed, and
a plasma frequency is 2.5 eV or more and 10.0 eV or less.

6. An infrared-absorbing material dispersion object comprising:

an infrared-absorbing material; and
a thermoplastic resin, wherein
the infrared-absorbing material includes:
at least one kind of transition metal; and
at least one kind of element selected from B, C, N, O, F, Al, Si, P, S, CI, Se, and Te as a ligand of the transition metal, wherein
at a bottom part of a conduction band, a bottom band of the conduction band is formed, the bottom band of the conduction band being a band occupied by d orbitals of the transition metal or a band in which the d orbitals of the transition metal and p orbitals of the ligand are hybridized,
at a top part of a valence band, a top band of the valence band is formed, the top band of the valence band being a band occupied by the p orbitals of the ligand or a band in which the p orbitals of the ligand and the d orbitals of the transition metal are hybridized,
in two wavenumber directions or less, which are highly symmetric points in a Brillouin zone, the bottom band of the conduction band and the top band of the valence band are close to each other by less than 3.0 eV,
in another wavenumber direction excluding the wavenumber direction in which the bottom band of the conduction band and the top band of the valence band are close to each other by less than 3.0 eV, a wide band gap structure, in which a band gap is 3.0 eV or more, is formed, and
a plasma frequency is 2.5 eV or more and 10.0 eV or less.

7. The infrared-absorbing material dispersion object according to claim 6, wherein
the thermoplastic resin is one kind of resin selected from a resin group including polyethylene terephthalate resin, polycarbonate resin, acrylic resin, styrene resin, polyamide resin, polyethylene resin, vinyl chloride resin, olefin resin, epoxy resin, polyimide resin, fluororesin, an ethylene-vinyl acetate copolymer, and polyvinyl acetal resin,
or a mixture of two or more kinds of resin selected from the resin group,
or a copolymer of two or more kinds of resin selected from the resin group.

8. The infrared-absorbing material dispersion object according to claim 6, wherein the infrared-absorbing material dispersion object has a sheet shape, a board shape, or a film shape.

9. A transparent base laminated with the infrared-absorbing material dispersion object comprising:
a plurality of transparent bases; and
the infrared-absorbing material dispersion object according to claim 6, wherein
the infrared-absorbing material dispersion object is disposed between the plurality of transparent bases.

10. An infrared-absorbing transparent base comprising:
a transparent base; and
the infrared-absorbing material dispersion object according to claim 6 that is disposed as a coating layer on at least one side of the transparent base.

* * * * *